(12) United States Patent
Watanabe et al.

(10) Patent No.: US 12,449,516 B2
(45) Date of Patent: Oct. 21, 2025

(54) DISTANCE MEASURING SENSOR, SIGNAL PROCESSING METHOD, AND DISTANCE MEASURING MODULE

(71) Applicant: Sony Semiconductor Solutions Corporation, Kanagawa (JP)

(72) Inventors: Masahiro Watanabe, Tokyo (JP); Tomonori Masuno, Kanagawa (JP); Takeshi Sasaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1018 days.

(21) Appl. No.: 17/609,603

(22) PCT Filed: May 22, 2020

(86) PCT No.: PCT/JP2020/020246
§ 371 (c)(1),
(2) Date: Nov. 8, 2021

(87) PCT Pub. No.: WO2020/246264
PCT Pub. Date: Dec. 10, 2020

(65) Prior Publication Data
US 2022/0214435 A1    Jul. 7, 2022

(30) Foreign Application Priority Data

Jun. 5, 2019   (JP) ................. 2019-105015

(51) Int. Cl.
*G01C 3/08*     (2006.01)
*G01S 7/4914*   (2020.01)
*G01S 17/894*   (2020.01)

(52) U.S. Cl.
CPC .......... *G01S 7/4914* (2013.01); *G01S 17/894* (2020.01)

(58) Field of Classification Search
CPC ............................ G01S 7/4914; G01S 17/894
See application file for complete search history.

(56) References Cited

U.S. PATENT DOCUMENTS

| | | | |
|---|---|---|---|
| 2019/0012796 A1* | 1/2019 | Yamasaki | ................ G06T 7/11 |
| 2019/0113606 A1 | 4/2019 | Charles et al. | |
| 2020/0264311 A1* | 8/2020 | Le Dortz | ............... G01S 17/36 |

FOREIGN PATENT DOCUMENTS

| CN | 103747586 A | 4/2014 |
|---|---|---|
| CN | 104808213 A | 7/2015 |

(Continued)

OTHER PUBLICATIONS

International Search Report (PCT/ISA/210), International Application No. PCT/JP2020/020246, dated Jul. 22, 2020.

*Primary Examiner* — Mark Hellner
(74) *Attorney, Agent, or Firm* — Michael Best & Friedrich LLP

(57) ABSTRACT

Distance measuring is disclosed. In one example, a distance measuring sensor includes a light receiving unit that receives reflected light obtained by reflection of irradiation light emitted from a predetermined light emitting source by an object; a depth calculation unit that calculates distance information to the object and luminance information from a signal obtained by the light receiving unit; and a detection processing unit that executes a predetermined detection process by using at least one of the distance information or the luminance information in accordance with a current operation mode selected from among a plurality of operation modes, and outputs a result of a detection process to the outside together with the distance information and the luminance information.

15 Claims, 17 Drawing Sheets

(56) References Cited

FOREIGN PATENT DOCUMENTS

| | | | | |
|---|---|---|---|---|
| CN | 104856663 A | 8/2015 | | |
| CN | 108474849 A | 8/2018 | | |
| CN | 109069008 A | 12/2018 | | |
| JP | 2009085705 A1 | 4/2009 | | |
| JP | 2012117896 A1 | 6/2012 | | |
| JP | 2015079416 A1 | 4/2015 | | |
| JP | 2017054337 A | * 3/2017 | ............. | G01B 11/22 |
| WO | 2017/141957 A1 | 8/2017 | | |
| WO | 2018/135320 A1 | 7/2018 | | |

* cited by examiner

DISTANCE MEASURING SENSOR, SIGNAL PROCESSING METHOD, AND DISTANCE MEASURING MODULE

TECHNICAL FIELD

The present technology relates to a distance measuring sensor, a signal processing method, and a distance measuring module, and more particularly, to a distance measuring sensor, a signal processing method, and a distance measuring module that enable a detection process based on distance measurement data.

BACKGROUND ART

In recent years, with the progress of semiconductor technology, miniaturization of a distance measuring module that measures the distance to an object has advanced. Therefore, for example, installation of the distance measuring module on a mobile terminal such as a so-called smartphone, which is a small information processing device having a communication function, is realized.

Examples of a distance measuring method in the distance measuring module include an indirect time of flight (ToF) method and a structured light method. In the Indirect ToF method, light is emitted toward an object and the light reflected on a surface of the object is detected, and the distance to the object is calculated on the basis of a measurement value obtained by measuring a flight time of the light. In the structured light method, pattern light is emitted toward an object, and the distance to the object is calculated on the basis of an image obtained by imaging distortion of a pattern on a surface of the object.

A distance measuring sensor of the Indirect ToF method that adopts a back-illuminated structure in order to improve light receiving characteristics (See, for example, Patent Document 1.) has been proposed.

In some smartphones, a face authentication process of authenticating the face of a user is used, for example, to unlock the screen. In the preprocessing for performing the face authentication process, a detection process of detecting the user, such as whether the user is in front of the smartphone, is performed. This detection processing has been executed by an application processor of a smartphone on the basis of an output from a distance measuring sensor.

CITATION LIST

Patent Document

Patent Document 1: International Publication No. 2018/135320

SUMMARY OF THE INVENTION

Problems to be Solved by the Invention

However, in order to reduce the amount of power required by a smartphone, it is required to perform part of the detection process by a distance measuring sensor.

The present technology has been made in view of such a situation, and enables a distance measuring sensor to execute a detection process based on distance measurement data.

Solution to Problems

A distance measuring sensor according to a first aspect of the present technology includes: a light receiving unit that receives reflected light obtained by reflection of irradiation light emitted from a predetermined light emitting source by an object; a depth calculation unit that calculates distance information to the object and luminance information from a signal obtained by the light receiving unit; and a detection processing unit that executes a predetermined detection process by using at least one of the distance information or the luminance information in accordance with a current operation mode selected from among a plurality of operation modes, and outputs a result of a detection process to an outside together with the distance information and the luminance information.

A signal processing method according to a second aspect of the present technology includes: by using a distance measuring sensor, calculating distance information to an object and luminance information from a signal obtained by receiving reflected light obtained by reflection of irradiation light emitted from a predetermined light emitting source by the object; and by using the distance measuring sensor, executing a predetermined detection process by using at least one of the distance information or the luminance information in accordance with a current operation mode selected from among a plurality of operation modes, and outputting a result of a detection process to an outside together with the distance information and the luminance information.

A distance measuring module according to a third aspect of the present technology includes: a light emitting unit that includes a predetermined light emitting source; and a distance measuring sensor, the distance measuring sensor including: a light receiving unit that receives reflected light obtained by reflection of irradiation light emitted from the predetermined light emitting source by an object; a depth calculation unit that calculates distance information to the object and luminance information from a signal obtained by the light receiving unit; and a detection processing unit that executes a predetermined detection process by using at least one of the distance information or the luminance information in accordance with a current operation mode selected from among a plurality of operation modes, and outputs a result of a detection process to an outside together with the distance information and the luminance information.

In the first to third aspects of the present technology, distance information to an object and luminance information are calculated from a signal obtained by receiving reflected light obtained by reflection of irradiation light emitted from a predetermined light emitting source by the object, a predetermined detection process is executed by using at least one of the distance information or the luminance information in accordance with a current operation mode selected from among a plurality of operation modes, and a result of a detection process is output to the outside together with the distance information and the luminance information.

The distance measuring sensor and the distance measuring module may be an independent device or a module incorporated in another device.

MODE FOR CARRYING OUT THE INVENTION

Hereinafter, embodiments for implementing the present technology (hereinafter, referred to as embodiments) will be described. Note that the description will be given in the following order.

1. Configuration Example of Smartphone
2. Schematic Configuration Example of Distance Measuring Module
3. Distance Measurement Operation of Distance Measuring Sensor by Indirect ToF Method
4. Detection Process According to Operation Mode
5. Effect of Distance Measuring Sensor
6. Example of Application to Moving Object <1. Configuration Example of Smartphone>

Figure 1:
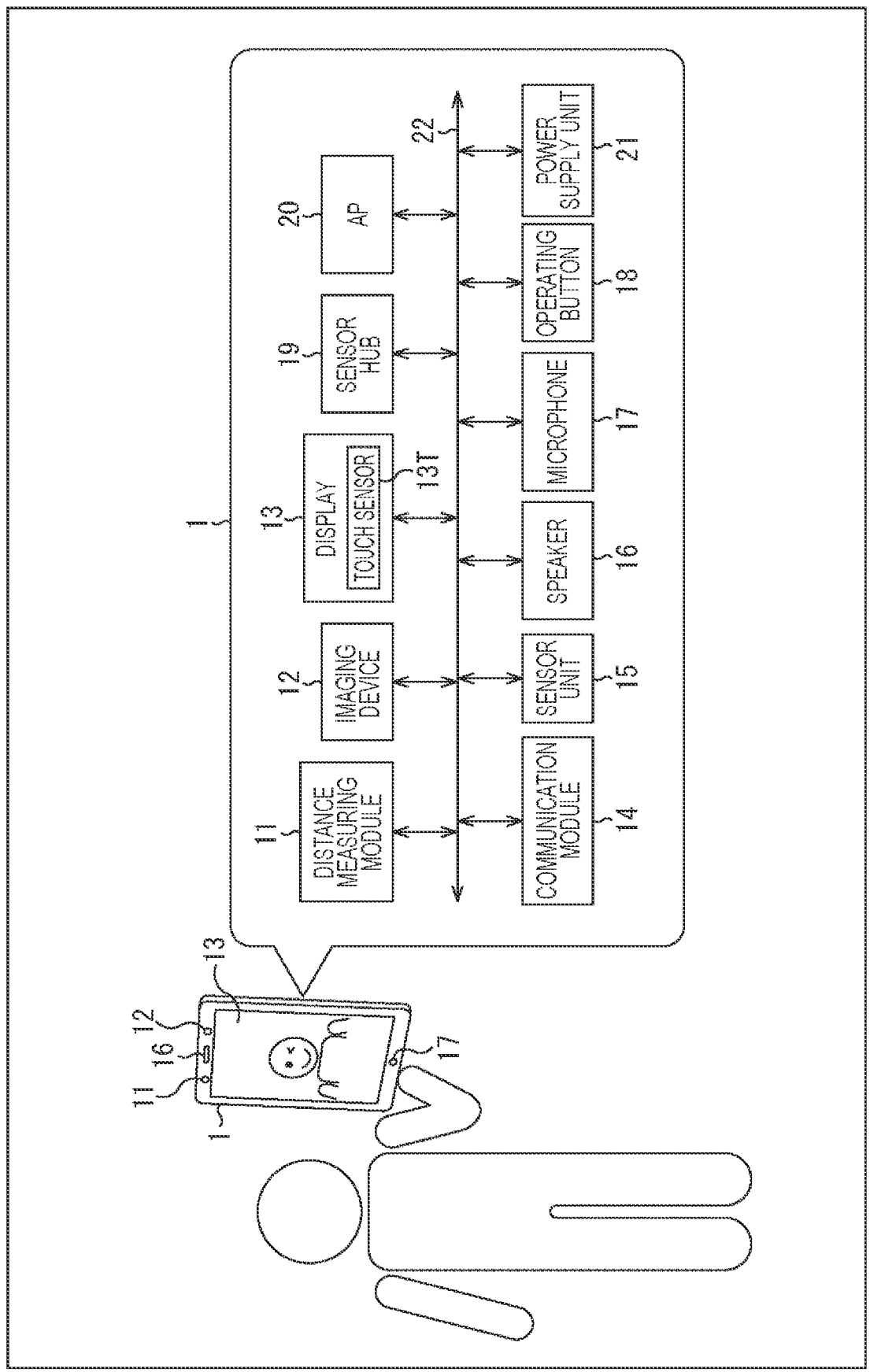
FIG. 1 is a block diagram illustrating a schematic configuration example of a smartphone as an electronic apparatus to which the present technology is applied.

FIG. 1 is a block diagram illustrating a schematic configuration example of a smartphone as an electronic apparatus to which the present technology is applied.

As illustrated in FIG. 1, a smartphone 1 is configured by connecting a distance measuring module 11, an imaging device 12, a display 13, a communication module 14, a sensor unit 15, a speaker 16, a microphone 17, an operating button 18, a sensor hub 19, an application processor (AP) 20, and a power supply unit 21 via a bus 22.

The distance measuring module 11 is arranged on a front surface of the smartphone 1, and performs distance measurement for the user of the smartphone 1. Thus, the distance measuring module 11 measures distance information (measures a distance) to a target such as the face, a hand, a finger, or the like of the user and outputs the distance information.

The imaging device 12 is arranged on the front surface of the smartphone 1, and performs imaging with the user of the smartphone 1 as a subject to acquire an image of the user. Note that although not illustrated, an imaging device is also arranged on the back surface of the smartphone 1.

The display 13 displays an operation image generated by processing performed by an application program, an operation system, or the like, an image captured by the imaging device 12, and the like. A touch sensor 13T is superimposed on the upper surface of the display 13, and the touch sensor 13T detects a location on the display 13 touched by the user and outputs the location to the sensor hub 19.

The communication module 14 performs communication via a predetermined network such as communication (call) through a mobile phone network or a public wireless communication network, or short-range wireless communication such as wireless LAN or Bluetooth (registered trademark).

The sensor unit 15 includes, for example, one or more predetermined sensors such as an acceleration sensor, a gyro sensor, an atmospheric pressure sensor, or a geomagnetic sensor, and outputs a detection result of each sensor to the sensor hub 19.

The speaker 16 outputs voice of the other party, for example, when a call is made by using the smartphone 1. The microphone 17 collects the voice of the user, for example, when a call is made by using the smartphone 1.

The operating button 18 includes one or more buttons such as a power button or a volume button, detects a pressing operation by the user, and outputs the pressing operation to the sensor hub 19.

The sensor hub 19 constantly monitors sensor devices such as the touch sensor 13T, each sensor of the sensor unit 15, and the operating button 18, and detects an operation on the smartphone 1 and a predetermined state of the smartphone 1. The sensor hub 19 is an arithmetic device (CPU) provided separately from the AP 20 so as to require less power even if operating in the always-on state in order to realize constant monitoring of the sensor device.

The AP 20 is an arithmetic device that executes an application program and the operation system stored in a storage unit, not illustrated, and includes a microprocessor, a graphics processing unit (GPU), and the like.

The power supply unit 21 includes, for example, a battery and a power supply control circuit or the like, and supplies power to each unit (circuit) of the smartphone 1, detects a remaining voltage, and accumulates (charges) necessary power.

In some of the smartphones 1 configured as described above, a face authentication process of authenticating the face of the user can be executed. The face authentication process is used, for example, for user authentication when screen lock is unlocked. In a case where the face authentication process is executed, first, a detection process of detecting the user, such as whether the user is at an appropriate distance in front of the smartphone 1, is performed. The detection process may be executed by the AP 20 that executes the face authentication process; however, the distance measuring module 11 of the smartphone 1 is also designed so as to be able to execute the detection process.

Hereinafter, the detection function of the distance measuring module 11 mounted on the smartphone 1 will be described in detail.

<2. Schematic Configuration Example of Distance Measuring Module>

Figure 2:
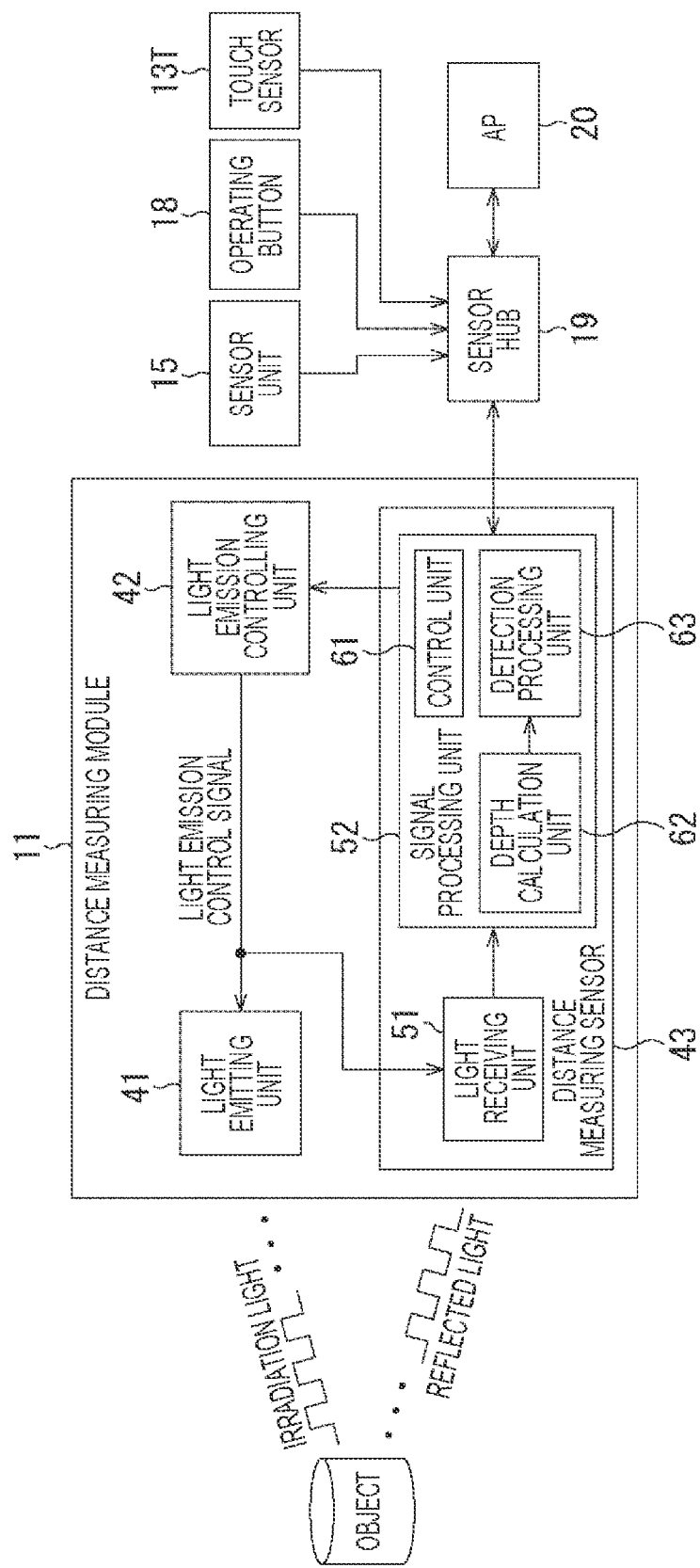
FIG. 2 is a block diagram illustrating a detailed configuration example of a distance measuring module.

FIG. 2 is a block diagram illustrating a detailed configuration example of the distance measuring module 11. Note that FIG. 2 also illustrates other blocks of the smartphone 1 related to the detection process of the distance measuring module 11.

The distance measuring module 11 is a distance measuring module that performs distance measurement by the Indirect ToF method, and includes a light emitting unit 41, a light emission controlling unit 42, and a distance measuring sensor 43.

The distance measuring module 11 irradiates an object with light, receives light (reflected light) obtained by reflection of the light (irradiation light) by the object, and thus generates and outputs a depth map (distance image) as distance information to the object and a reliability map (reliability image) as luminance information.

The distance measuring sensor 43 includes a light receiving unit 51 and a signal processing unit 52. The distance measuring sensor 43 can be manufactured as one-chip semiconductor package (CSP) including a laminated substrate in which a first semiconductor substrate and a second semiconductor substrate are laminated, a pixel array unit is arranged on the first semiconductor substrate having an incident surface to which reflected light is input, and a logic circuit, a memory circuit, and the like to be the signal processing unit 52 are arranged on the second semiconductor substrate. Note that, as a matter of course, the distance measuring sensor 43 may include two or more divided chips, or may include a one-chip semiconductor package (CSP) including a laminated substrate of three or more semiconductor substrates.

The light emitting unit 41 includes, for example, an infrared laser diode or the like as a light source, emits light while performing modulation at a timing corresponding to a light emission control signal supplied from the light emission controlling unit 42 according to control performed by the light emission controlling unit 42, and irradiates an object with irradiation light.

The light emission controlling unit 42 controls light emission from the light emitting unit 41 by supplying to the light emitting unit 41 a light emission control signal for controlling a frequency (for example, 20 MHz or the like) and a light emission amount when the light source is caused to emit light. Furthermore, the light emission controlling unit 42 supplies the light emission control signal also to the light receiving unit 51 in order to drive the light receiving unit 51 in accordance with the light emission timing of the light emitting unit 41.

The light receiving unit 51 receives reflected light obtained by reflection of irradiation light by the object. Then, the light receiving unit 51 includes a pixel array unit in which pixels which each generate electric charge according to the amount of received light and output a signal according to the electric charge are two-dimensionally arranged in a matrix in the row direction and the column direction, and each pixel outputs a light reception signal A and a light reception signal B obtained by distributing the electric charge according to the amount of received light to a first tap and a second tap to the signal processing unit 52. The light receiving operation of the light receiving unit 51 will be described later in detail with reference to FIGS. 3 to 7.

The signal processing unit 52 includes a control unit 61, a depth calculation unit 62, and a detection processing unit 63.

If a predetermined operation serving as a trigger for starting a detection process is detected in the sensor unit 15, the operating button 18, the touch sensor 13T, or the like, the sensor hub 19 supplies a start command for starting distance measurement to the control unit 61 of the distance measuring sensor 43. Examples of the operation that is a trigger for starting a detection process include an operation of moving the smartphone 1 supplied from an inertial sensor (gyro sensor, acceleration sensor) that is one of the sensor units 15, an operation of pressing the power button that is one of the operating buttons 18, and an operation of starting a predetermined application program detected by the touch sensor 13T.

If a distance measurement start command is supplied from the sensor hub 19, the control unit 61 instructs the light emission controlling unit 42 to start light emission. The control unit 61 can specify a predetermined frequency and a light emission amount so that the exposure amount is appropriately adjusted (exposure is controlled) on the basis of the light reception signal supplied from the light receiving unit 51. Note that in an initial state in which no light reception signal is supplied from the light receiving unit 51, a frequency and a light emission amount determined in advance as initial values are set.

Moreover, the control unit 61 selects a predetermined operation mode from among a plurality of operation modes registered in advance, and causes the detection processing unit 63 to execute a predetermined detection process corresponding to the operation mode that is selected. For example, the operation mode is specified by a command or the like from the sensor hub 19, or specified by a high or low voltage signal of an input/output terminal connected to the sensor hub 19. Therefore, the control unit 61 detects the operation mode specified by the sensor hub 19 and selects the operation mode that is detected.

The depth calculation unit 62 generates a depth map and a reliability map from two light reception signals A and B of each pixel supplied from the light receiving unit 51. More specifically, the depth calculation unit 62 calculates a depth value, which is a distance from the distance measuring module 11 to the object, for each pixel of the light receiving unit 51. Then, the depth calculation unit 62 generates a depth map in which a depth value is stored as a pixel value of each pixel. Furthermore, the depth calculation unit 62 also calculates the reliability of the calculated depth value for each pixel of the light receiving unit 51, and generates a reliability map in which the reliability is stored as the pixel value of each pixel.

The detection processing unit 63 executes a predetermined detection process by using at least one of the depth map as the distance information and the reliability map as the luminance information, in accordance with the operation mode specified by the control unit 61. Then, the detection processing unit 63 outputs the result of the detection process to the sensor hub 19 together with the depth map and the reliability map.

Under the control of the control unit 61, the detection processing unit 63 changes the type (processing content), the order (sequence), the number, and the like of the detection processes according to the operation mode. In other words, the control unit 61 causes the detection processing unit 63 to execute predetermined detection processes different in type (processing content), order (sequence), number, and the like according to the operation mode. Details of the detection process will be described later.

The result of the detection process, the depth map, and the reliability map output to the sensor hub 19 are supplied to the AP 20. The AP 20 executes the face authentication process on the basis of the depth map and the reliability map.

<3. Distance Measurement Operation of Distance Measuring Sensor by Indirect ToF Method>

Before explaining the detection function of the distance measuring sensor 43, distance measuring operation of the distance measuring sensor 43 as a premise thereof will be described with reference to FIGS. 3 to 7.

Figure 3:
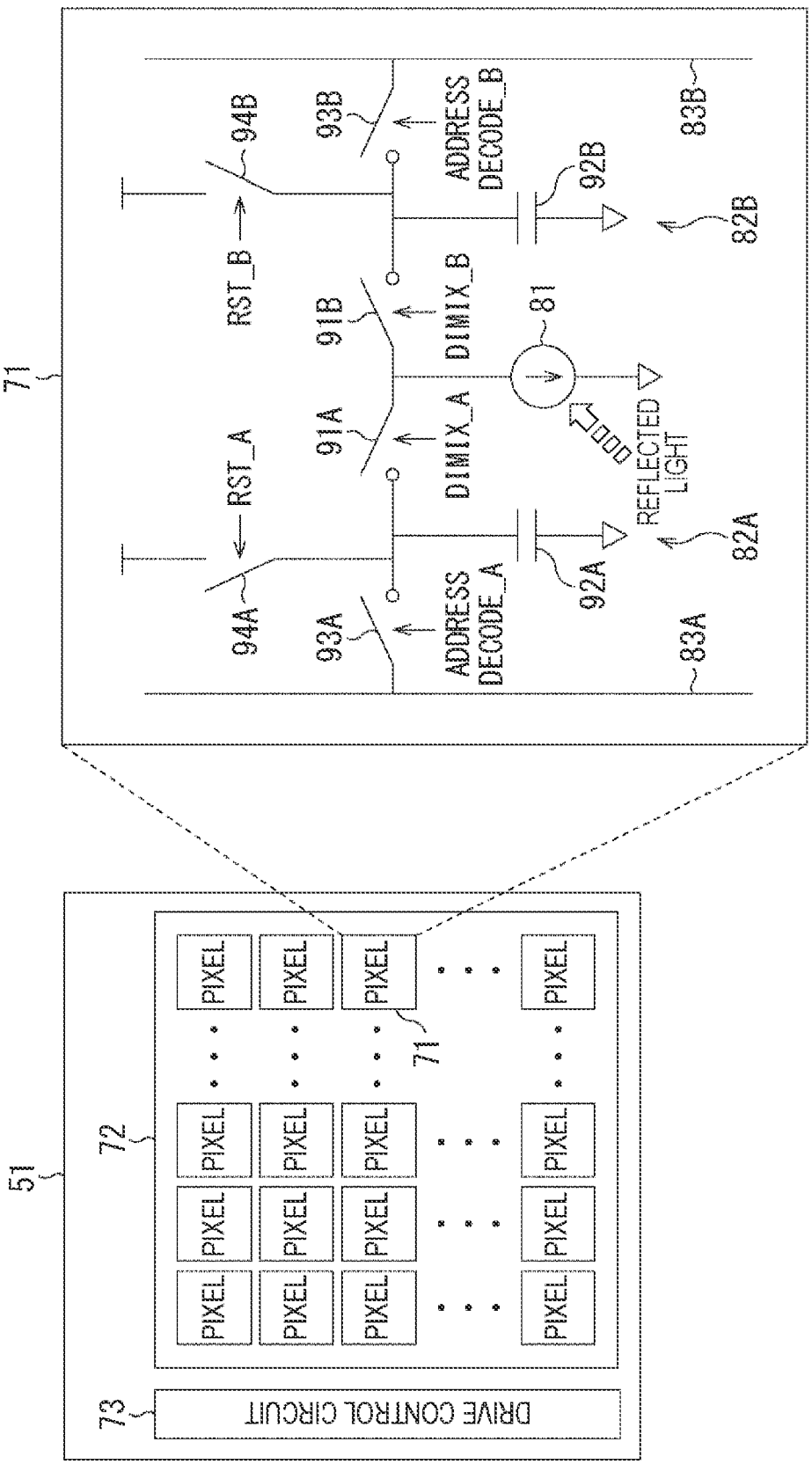
FIG. 3 is a diagram illustrating a detailed configuration example of a light receiving unit.

FIG. 3 illustrates a detailed configuration example of the light receiving unit 51.

The light receiving unit 51 includes a pixel array unit 72 in which pixels 71 which each generate electric charge according to the amount of received light and output a signal according to the electric charge are two-dimensionally arranged in a matrix in the row direction and the column direction, and a drive control circuit 73 arranged in a peripheral region of the pixel array unit 72.

The drive control circuit 73 outputs a control signal (for example, a distribution signal DIMIX, a selection signal ADDRESS DECODE, a reset signal RST, and the like to be described later) for controlling driving of the pixel 71 on the basis of, for example, a light emission control signal supplied from the light emission controlling unit 42.

The pixel 71 includes a photodiode 81, and a first tap 82A and a second tap 82B that detect electric charge photoelectrically converted by the photodiode 81. In the pixel 71, electric charge generated in the one photodiode 81 is distributed to the first tap 82A or the second tap 82B. Then, the electric charge generated in the photodiode 81 and distributed to the first tap 82A is output as a light reception signal A from a signal line 83A, and the electric charge generated in the photodiode 81 and distributed to the second tap 82B is output as a light reception signal B from a signal line 83B.

The first tap 82A includes a transfer transistor 91A, a floating diffusion (FD) unit 92A, a selection transistor 93A, and a reset transistor 94A. Similarly, the second tap 82B includes a transfer transistor 91B, an FD unit 92B, a selection transistor 93B, and a reset transistor 94B.

Operation of the pixel 71 will be described.

Figure 4:
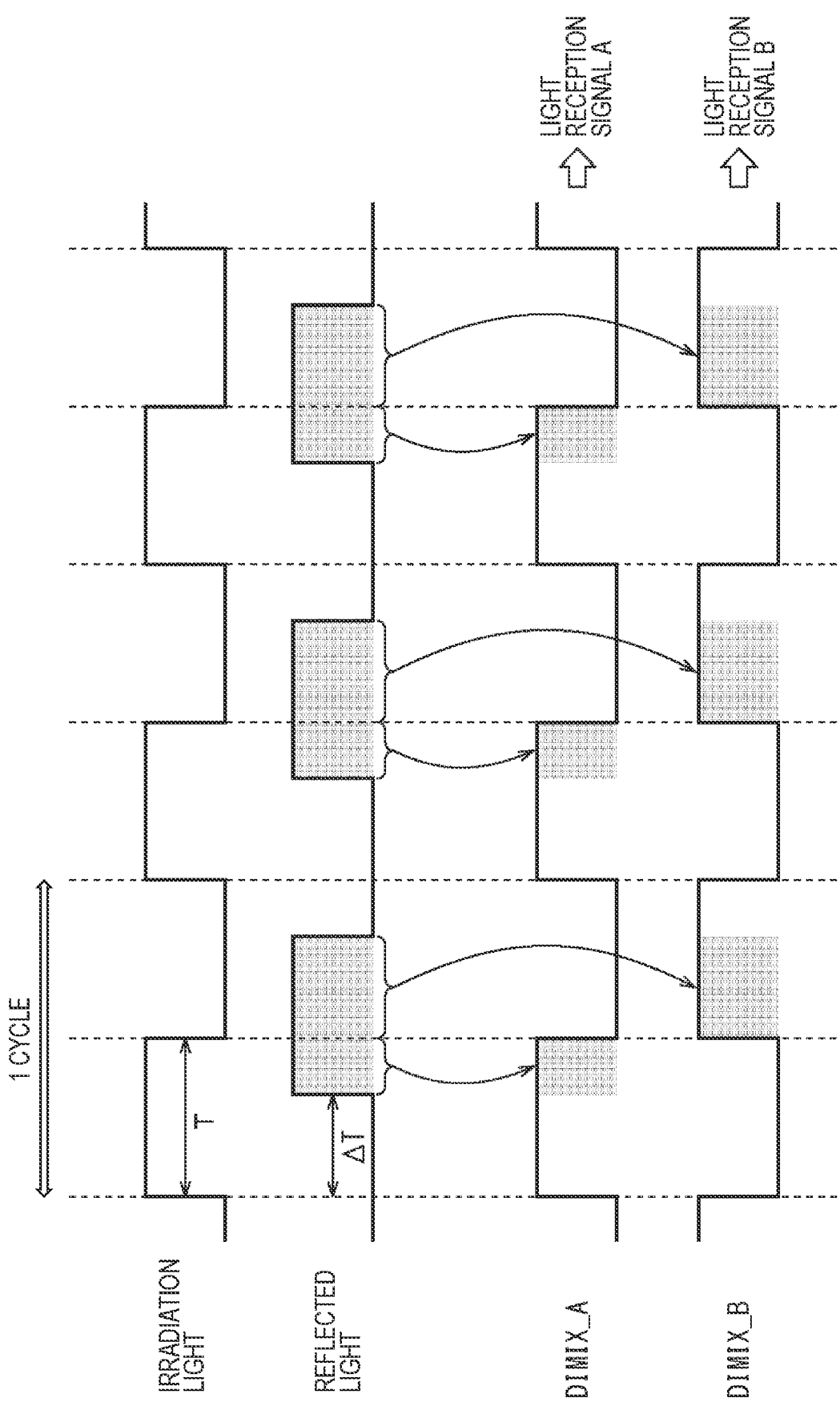
FIG. 4 is a diagram explaining operation of a pixel according to a 4-phase method.

As illustrated in FIG. 4, the light emitting unit 41 outputs irradiation light modulated (one cycle=2T) so as to repeat on/off of irradiation at an irradiation time T, and the photodiode 81 receives the reflected light with a delay of a delay time ΔT corresponding to the distance to the object. Furthermore, a distribution signal DIMIX_A controls on/off of the transfer transistor 91A, and a distribution signal DIMIX_B controls on/off of the transfer transistor 91B. The distribution signal DIMIX_A is a signal having the same phase as that of the irradiation light, and the distribution signal DIMIX_B has a phase obtained by inverting the phase of the distribution signal DIMIX_A.

Therefore, in FIG. 3, electric charge generated by reception of the reflected light by the photodiode 81 is transferred to the FD unit 92A while the transfer transistor 91A is turned on according to the distribution signal DIMIX_A, and is transferred to the FD unit 92B while the transfer transistor 91B is turned on according to the distribution signal DIMIX_B. Therefore, in a predetermined period during which irradiation with the irradiation light for the irradiation time T is periodically performed, the electric charge transferred via the transfer transistor 91A is sequentially accumulated in the FD unit 92A, and the electric charge transferred via the transfer transistor 91B is sequentially accumulated in the FD unit 92B.

Then, if the selection transistor 93A is turned on according to a selection signal ADDRESS DECODE_A after the end of the period for accumulating electric charge, the electric charge accumulated in the FD unit 92A is read via the signal line 83A, and the light reception signal A corresponding to the amount of the electric charge is output from the light receiving unit 51. Similarly, if the selection transistor 93B is turned on according to a selection signal ADDRESS DECODE_B, the electric charge accumulated in the FD unit 92B is read via the signal line 83B, and the light reception signal B corresponding to the amount of the electric charge is output from the light receiving unit 51. Furthermore, the electric charge accumulated in the FD unit 92A is discharged if the reset transistor 94A is turned on according to a reset signal RST_A, and the electric charge accumulated in the FD unit 92B is discharged if the reset transistor 94B is turned on according to a reset signal RST_B.

As described above, the pixel 71 distributes the electric charge generated by the reflected light received by the photodiode 81 to the first tap 82A or the second tap 82B according to the delay time ΔT, and outputs the light reception signal A and the light reception signal B. Then, the delay time ΔT corresponds to the time taken for the light emitted from the light emitting unit 41 to fly to the object, be reflected by the object, and then fly to the light receiving unit 51, that is, corresponds to the distance to the object. Therefore, the distance measuring module 11 can obtain the distance (depth value) to the object according to the delay time ΔT on the basis of the light reception signal A and the light reception signal B.

However, in the pixel array unit 72, there is a case where the light reception signal A and the light reception signal B are affected differently for each pixel 71 due to a deviation (sensitivity difference) in characteristics of each element such as the photodiode 81 and the pixel transistor such as the transfer transistor 91 included in each pixel 71. Therefore, in the distance measuring module 11 of the Indirect ToF method, a technique of removing the sensitivity difference between the taps of each pixel and improving the SN ratio by acquiring the light reception signal A and the light reception signal B obtained by receiving reflected light by changing the phase in the same pixel 71 is adopted.

As a method of receiving reflected light by changing the phase and calculating the depth value, for example, a detection method by using two phases (2-phase method) and a detection method by using four phases (4-phase method) will be described.

Figure 5:
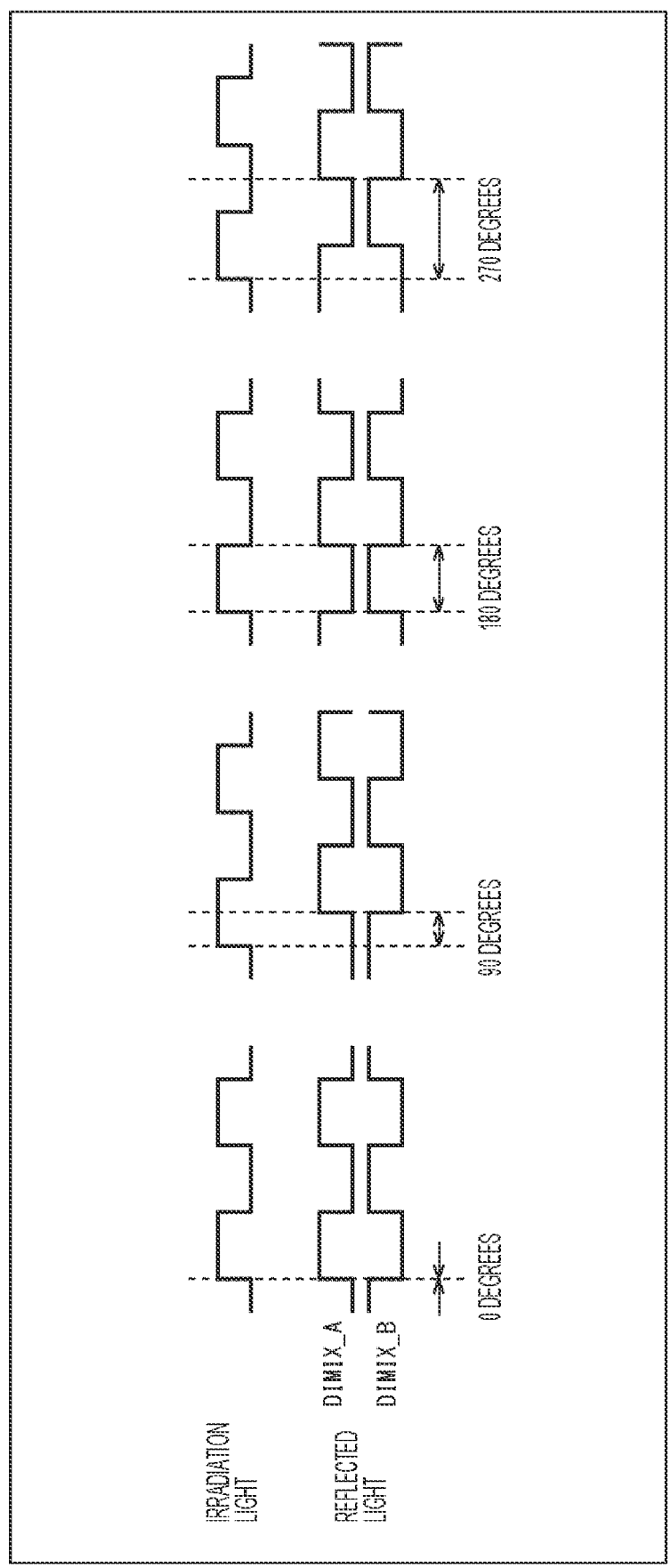
FIG. 5 is a diagram explaining the 4-phase method.

As illustrated in FIG. 5, the light receiving unit 51 receives reflected light at light receiving timings with phases shifted by 0°, 90°, 180°, and 270° with respect to the irradiation timing of irradiation light. More specifically, the light receiving unit 51 receives reflected light by changing the phase in a time division manner such that in a certain frame period, light is received with the phase set to 0° with respect to the irradiation timing of the irradiation light, in the next frame period, light is received with the phase set to 90°, in the next frame period, light is received with the phase set to 180°, and in the next frame period, light is received with the phase set to 270°.

Figure 6:
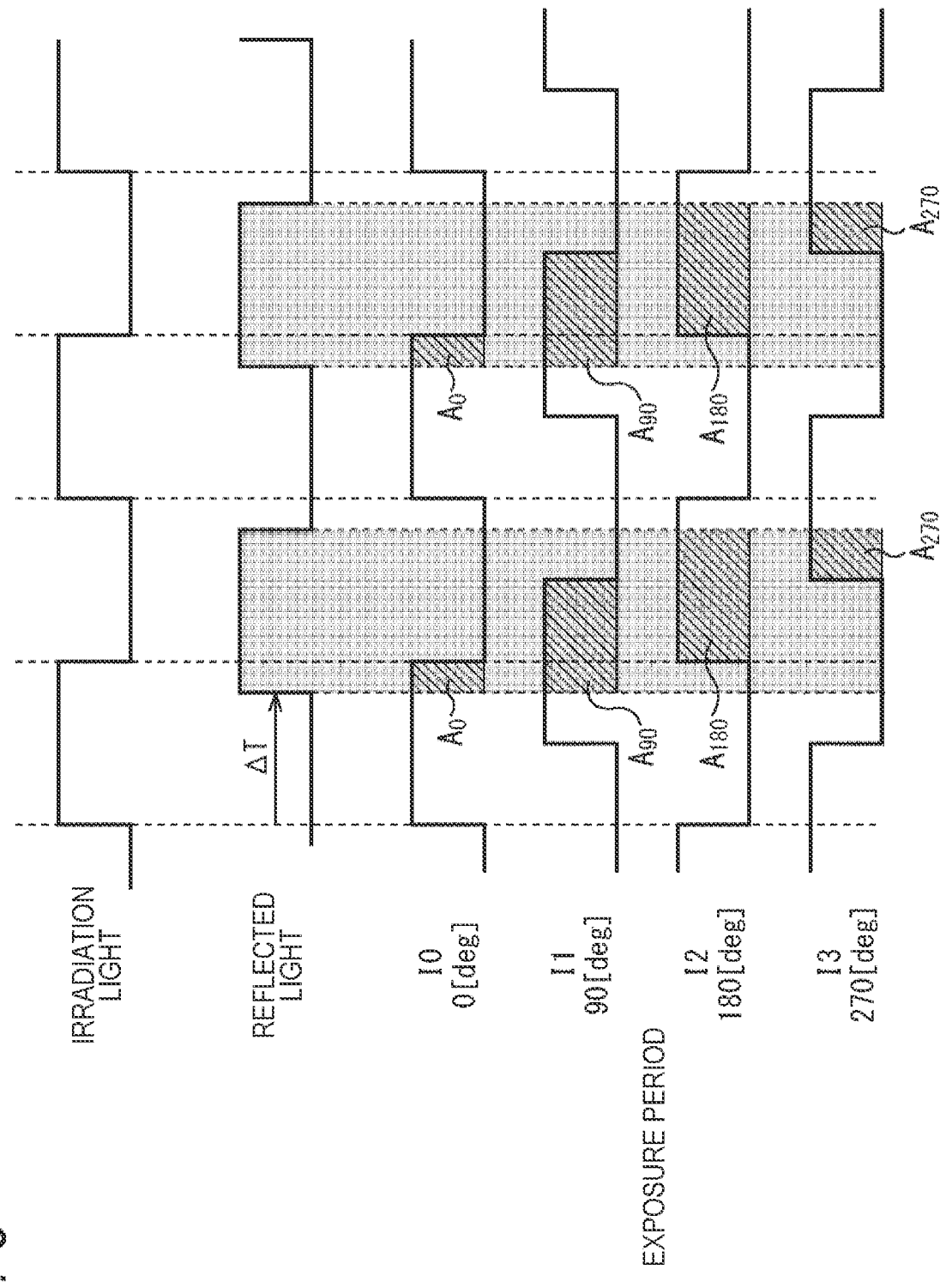
FIG. 6 is a diagram explaining the 4-phase method.

FIG. 6 is a diagram in which the exposure periods of the first tap 82A of the pixel 71 in the respective phases of 0°, 90°, 180°, and 270° are arranged so that the phase difference can be easily understood.

As illustrated in FIG. 6, in the first tap 82A, a light reception signal A obtained by receiving light in the same phase (phase 0°) as the irradiation light is referred to as a light reception signal $A_0$, a light reception signal A obtained by receiving light in the phase (phase 90°) shifted by 90° from the irradiation light is referred to as a light reception signal $A_{90}$, a light reception signal A obtained by receiving light in a phase (phase 180°) shifted by 180° from the irradiation light is referred to as a light reception signal $A_{180}$, and a light reception signal A obtained by receiving light in a phase (phase 270°) shifted by 270° from the irradiation light is referred to as a light reception signal $A_{270}$.

Furthermore, even though illustration is omitted, in the second tap 82B, a light reception signal B obtained by receiving light in the same phase (phase 0°) as the irradiation light is referred to as a light reception signal $B_0$, a light reception signal B obtained by receiving light in the phase (phase 90°) shifted by 90° from the irradiation light is referred to as a light reception signal $B_{90}$, a light reception signal B obtained by receiving light in a phase (phase 180°) shifted by 180° from the irradiation light is referred to as a light reception signal $B_{180}$, and a light reception signal B obtained by receiving light in a phase (phase 270°) shifted by 270° from the irradiation light is referred to as a light reception signal $B_{270}$.

Figure 7:
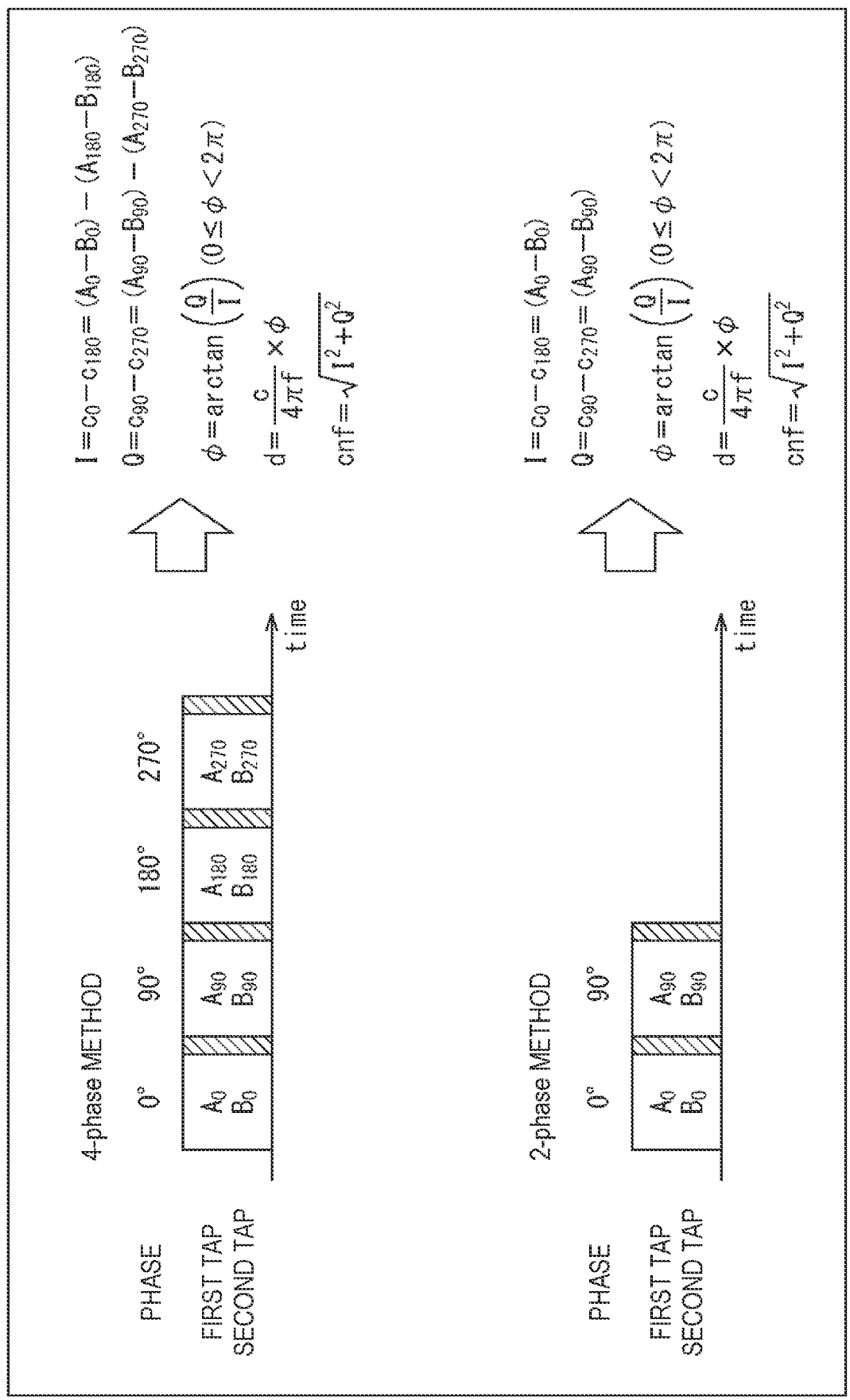
FIG. 7 is a diagram explaining methods of calculating a depth value by using a 2-phase method and the 4-phase method.

FIG. 7 is a diagram illustrating methods of calculating a depth value and a reliability by using the 2-phase method and the 4-phase method.

In the Indirect ToF method, the depth value d can be obtained by the following Formula (1).

[Mathematical Expression 1]

$$d = \frac{c \cdot \Delta T}{2} = \frac{c \cdot \phi}{4\pi f} \quad (1)$$

In Formula (1), c represents a speed of light, ΔT represents a delay time, and f represents a modulation frequency of light. Furthermore, φ in Formula (1) represents the phase shift amount [rad] of reflected light and is expressed by the following Formula (2).

[Mathematical Expression 2]

$$\phi = \arctan\left(\frac{Q}{I}\right) \quad (0 \le \phi < 2\pi) \quad (2)$$

In the 4-phase method, I and Q in Formula (2) are calculated by the following Formulas (3) using the light reception signals $A_0$ to $A_{270}$ and the light reception signals $B_0$ to $B_{270}$ obtained by setting the phases to 0°, 90°, 180°, and 270°. I and Q are signals which each are obtained by assuming that the luminance change of irradiation light is a cos wave and converting the phase of the cos wave from the polar coordinate to the orthogonal coordinate system (IQ plane).

$$I = c_0 - c_{180} = (A_0 - B_0) - (A_{180} - B_{180})$$

$$Q = c_{90} - c_{270} = (A_{90} - B_{90}) - (A_{270} - B_{270}) \quad (3)$$

In the 4-phase method, for example, by taking a difference between light reception signals in opposite phases in the same pixel, such as "$A_0-A_{180}$" and "$A_{90}-A_{270}$" in Formula (3), it is possible to remove characteristic variation between taps existing in each pixel, that is, fixed pattern noise.

In contrast, in the 2-phase method, the depth value d to the object can be obtained by using only two phases in an orthogonal relationship among the light reception signals $A_0$ to $A_{270}$ and the light reception signals $B_0$ to $B_{270}$ obtained by setting the phases to 0°, 90°, 180°, and 270°. For example, in a case where the light reception signals $A_0$ and $B_0$ in the phase of 0° and the light reception signals $A_{90}$ and $B_{90}$ in the phase of 90° are used, I and Q in Formula (2) are expressed by the following Formulas (4).

$$I = c_0 - c_{180} = (A_0 - B_0)$$

$$Q = c_{90} - c_{270} = (A_{90} - B_{90}) \quad (4)$$

For example, in a case where the light reception signals $A_{180}$ and $B_{180}$ in the phase of 180° and the light reception signals $A_{270}$ and $B_{270}$ in the phase of 270° are used, I and Q in Formula (2) are expressed by the following Formulas (5).

$$I = c_0 - c_{180} = -(A_{180} - B_{180})$$

$$Q = c_{90} - c_{270} = -(A_{270} - B_{270}) \quad (5)$$

In the 2-phase method, the characteristic variation between the taps existing in each pixel cannot be removed; however, the depth value d to the object can be obtained only by the light reception signals in the two phases. Therefore, distance measurement can be performed at a frame rate twice of that of the 4-phase method. The characteristic variation between the taps can be adjusted by a correction parameter such as a gain or an offset.

In the 2-phase method and the 4-phase method, the reliability cnf can be obtained by the following Formula (6).

[Mathematical Expression 3]

$$cnf = \sqrt{I^2 + Q^2} \quad (6)$$

In the present embodiment, it does not matter whether the distance measuring module 11 uses the I signal and the Q signal corresponding to the delay time ΔT calculated by the 4-phase method or the I signal and the Q signal corresponding to the delay time ΔT calculated by the 2-phase method to use the depth value d and the reliability cnf. Either the 4-phase method or the 2-phase method may be fixedly used, or for example, a method of appropriately selecting the 4-phase method or the 2-phase or blending the 4-phase method and the 2-phase according to the motion of the object or the like may be used. Hereinafter, for the sake of simplicity, it is assumed that the 4-phase method is employed.

<4. Detection Process According to Operation Mode>

The detection processing unit 63 executes a predetermined detection process by using at least one of the depth map or the reliability map supplied from the depth calculation unit 62 according to the current operation mode selected from among a plurality of operation modes, and outputs the result of the detection process to the sensor hub 19 together with the depth map and the reliability map.

Figure 8:
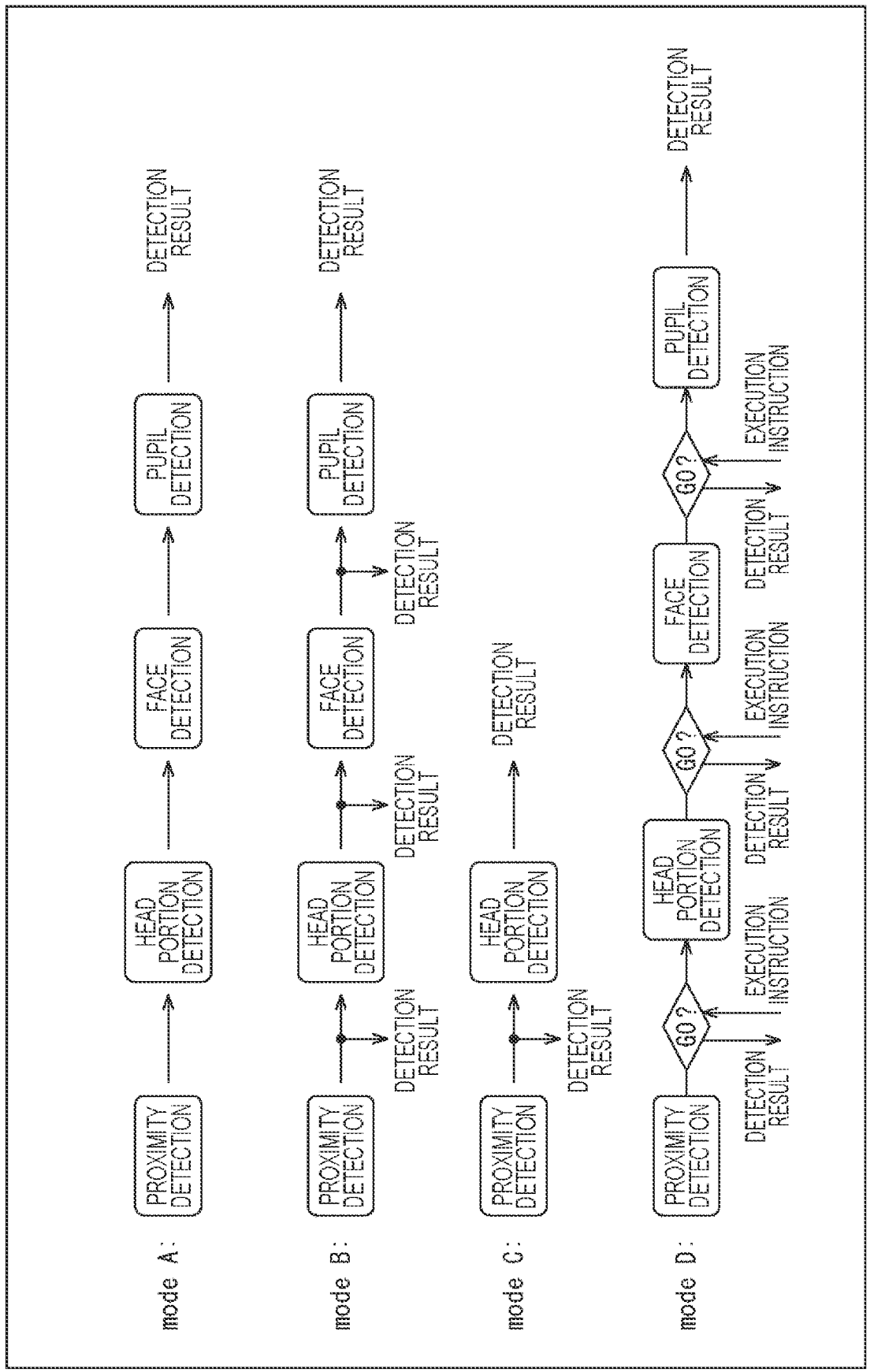
FIG. 8 is a diagram explaining a specific detection process executed in each operation mode.

FIG. 8 illustrates specific detection processes executed in predetermined operation modes among the plurality of operation modes. Note that the four operation modes, that is, the operation modes A to D illustrated in FIG. 8 are examples of the operation modes of the signal processing unit 52, and the signal processing unit 52 has another operation mode.

The detection processing unit 63 can execute, for example, each of a proximity detection process, a head portion detection process, a face detection process, and a pupil detection process as a detection process using at least one of the depth map or the reliability map. The proximity detection process is a process of detecting whether or not there is an object (nearby object) within a predetermined distance from the smartphone 1. Note that, regarding preprocessing of the face authentication process, even though the original target of the proximity detection process is the face (head) of the user, in a proximity process, if there is a predetermined object (nearby object) at a nearby location from the smartphone 1, including but not limited to a human face, it is determined that there is a nearby object. The head portion detection process is a process of detecting the head portion of the user (human). The face detection process is a process of detecting the face of the user. The pupil detection process is a process of detecting an eye and a line-of-sight of the user.

The detection process in the operation mode A is a process of sequentially executing the proximity detection process, the head portion detection process, the face detection process, and the pupil detection process in this order, and sequentially repeating the process of executing a next second detection process in a case where a detection target is detected in a first detection process executed earlier. Then, in a case where a pupil, which is a detection target, is detected in the pupil detection process, which is the last process, the detection result of the pupil is output to the sensor hub 19 together with the depth map and the reliability map.

Similarly to the operation mode A, the detection process in the operation mode B is a process of sequentially executing the proximity detection process, the head portion detection process, the face detection process, and the pupil detection process in this order, and sequentially repeating the process of executing a next second detection process in a case where a detection target is detected in a first detection process executed earlier. The detection process in the operation mode B is different from the detection process in the operation mode A in that in a case where a detection target is detected in each detection process, the detection result is output to the sensor hub 19. Then, in a case where a pupil, which is a detection target, is detected in the pupil detection process, which is the last process, the detection result of the pupil is output to the sensor hub 19 together with the depth map and the reliability map.

The detection process in the operation mode C is a process of executing only the proximity detection process and the head portion detection process among the four detection processes executed in the operation mode B. In a case where the user is detected at a nearby location in the proximity process, the detection result is output to the sensor hub 19, and in a case where the head portion is detected in the head portion detection process, which is the next process, the detection result, the depth map, and the reliability map are output to the sensor hub 19.

Note that the detection process in the operation mode C is a process of executing two processes, that is, the proximity detection process and the head portion detection process among the four detection processes, that is, the proximity detection process, the head portion detection process, the face detection process, and the pupil detection process; however, the detection processing unit 63 also has another operation mode of executing a detection process in which one or more of the four detection processes are combined in any order. For example, the detection processing unit 63 also has an operation mode in which only the proximity process is executed and the detection result, the depth map, and the reliability map are output to the sensor hub 19, an operation mode in which the proximity process and the face detection process are executed in this order, and in a case where the user is detected at a nearby location, the detection result is output to the sensor hub 19 and then the face detection process is executed, and in a case where a face is detected, the detection result, the depth map, and the reliability map are output to the sensor hub 19, and the like.

Similarly to the operation mode A, the detection process of the operation mode D is a process of executing the proximity detection process, the head portion detection process, the face detection process, and the pupil detection process in this order. The detection process of the operation mode D is different from the detection process of the operation mode A in that the detection result of a first detection process executed earlier is output to the sensor hub 19, and a second detection process, which is the next process, is executed when the second detection process is instructed from the sensor hub 19 on the basis of the detection result of the first detection process. Then, in a case where a pupil is detected in the pupil detection process, which is the last process, the pupil detection result, the depth map, and the reliability map are output to the sensor hub 19.

The detection process of an operation mode includes at least one of the proximity detection process, the head portion detection process, the face detection process, or the pupil detection process. In the detection process of any operation mode, in a case where the last detection process of the series of detection processes according to the operation mode is successful (a detection target is detected), the detection result, the depth map, and the reliability map are output to the sensor hub 19.

Figure 9:
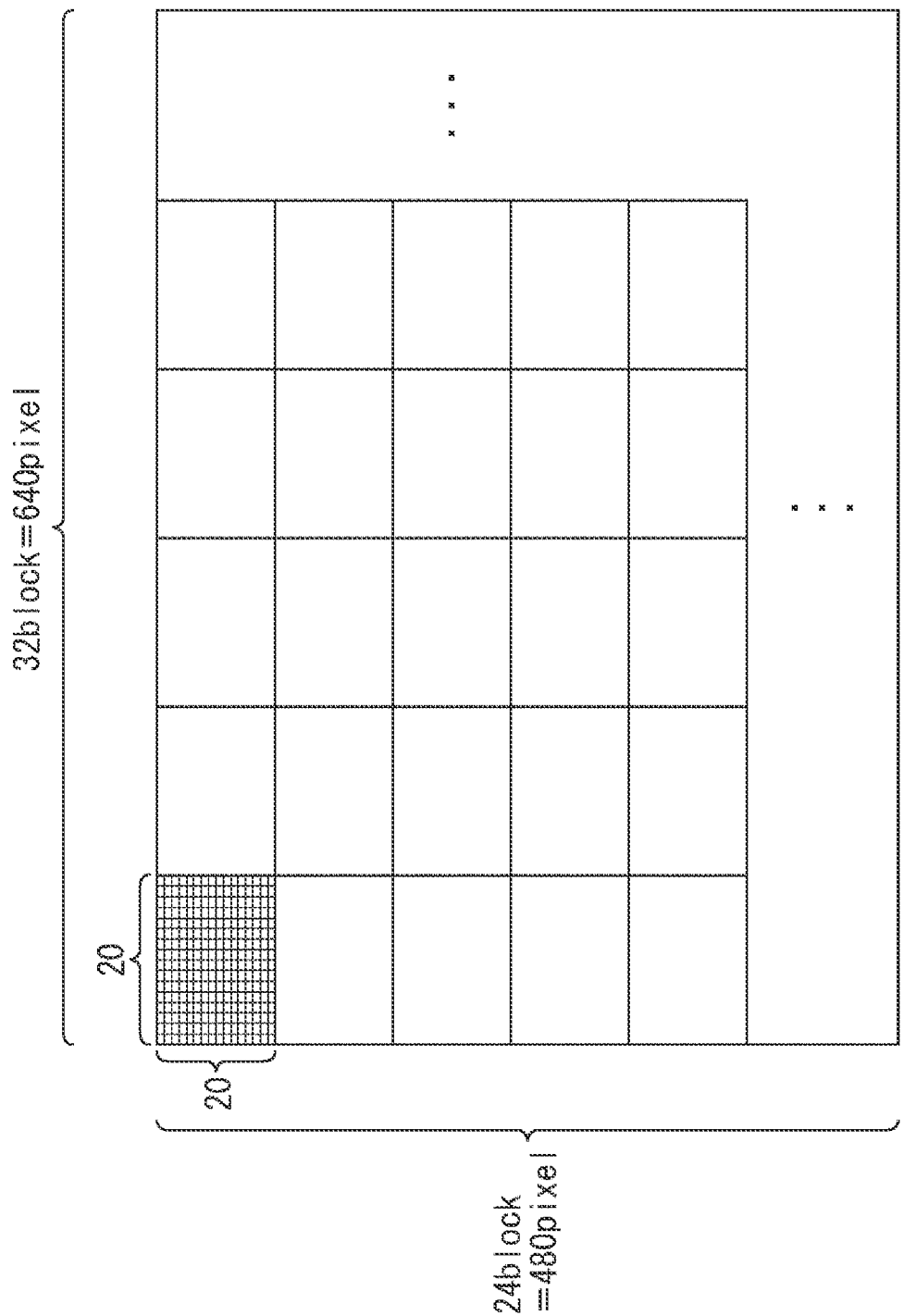
FIG. 9 is a diagram explaining a specific processing example of a proximity detection process.

FIG. 9 is a diagram explaining a specific processing example of the proximity detection process.

Note that, in the present embodiment, it is assumed that the pixel array unit 72 of the light receiving unit 51 has a pixel array of 640 pixels in the horizontal direction and 480 pixels in the vertical direction. Furthermore, it is assumed that the depth map and the reliability map used when the detection process is executed are generated on the basis of a light reception signal in which an exposure amount is appropriately adjusted (exposure is controlled) in the light receiving unit 51 on the basis of a light emission control signal for controlling the frequency and the light emission amount.

In the proximity detection process, the detection processing unit 63 groups all the 640×480 pixels into 32×24 blocks each including 20 pixels in each of the horizontal direction and the vertical direction. Then, the detection processing unit 63 determines one predetermined block among all the 32×24 blocks as a detection target block. The detection target block is, for example, a block located at the center of the pixel array unit 72.

Next, the detection processing unit 63 calculates an average value d_ave of the depth values d of the 20×20 pixels constituting the detection target block and an average value cnf_ave of the reliabilities cnf. Then, in a case where the average value d_ave of the depth values is in a predetermined range determined to be a proximity distance and the average value cnf_ave of the reliabilities cnf is in a predetermined range determined to be normal detection, the detection processing unit 63 detects that the user is at a nearby location from the smartphone 1. For example, assuming that a distance in a case where a person holds the smartphone 1 by hand and images himself/herself is about 70 cm at the maximum, it can be determined that a distance is a proximity distance in a case where the average value d_ave of the depth values is within 70 cm.

Figure 10:
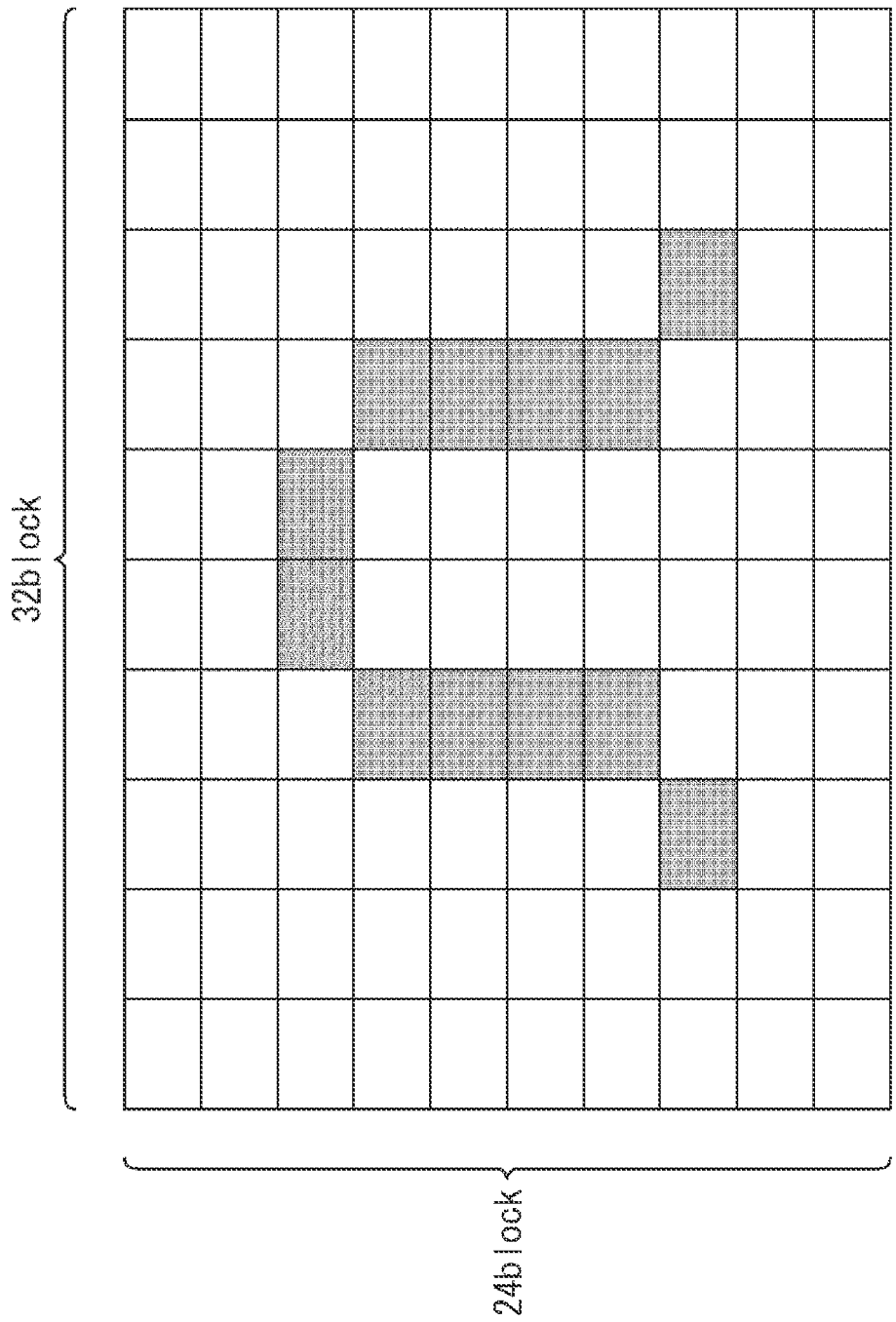
FIG. 10 is a diagram explaining a specific processing example of a head portion detection process.

FIG. 10 is a diagram explaining a specific processing example of the head portion detection process.

In the head portion detection process, the detection processing unit 63 calculates the average value cnf_ave of the reliabilities cnf of all the 32×24 blocks, and detects the head portion of the user on the basis of the average value cnf_ave of the reliabilities cnf of all the blocks that is calculated. Since the reliability cnf corresponds to the luminance information (luminance value), for example, the average value cnf_ave of the reliabilities cnf of the 32×24 blocks can be regarded as a low-resolution two-dimensional image, and the head portion of the user can be detected in the manner of pattern matching.

Figure 11:
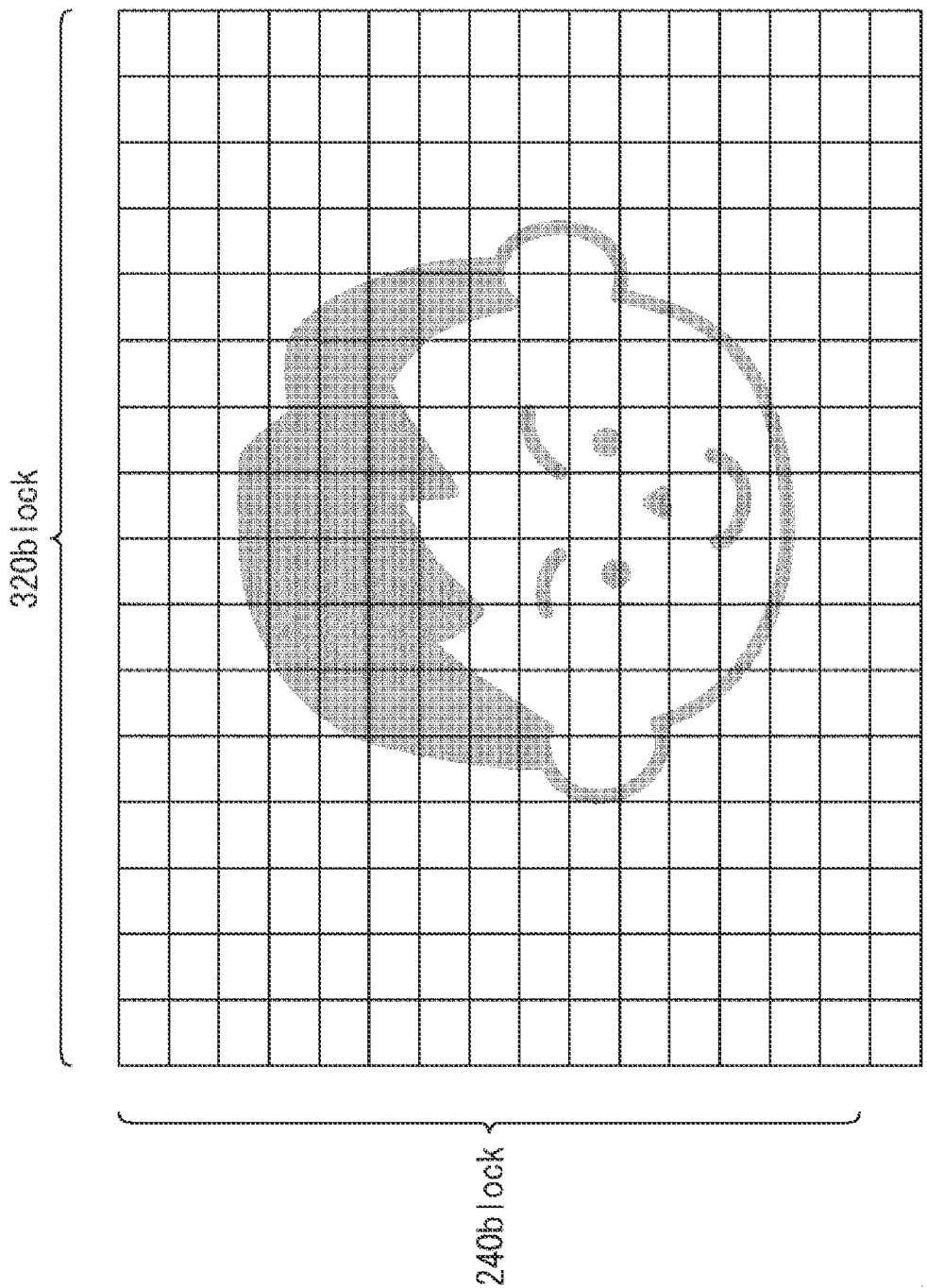
FIG. 11 is a diagram explaining a specific processing example of a face detection process.

FIG. 11 is a diagram explaining a specific processing example of the face detection process.

In the face detection process, the detection processing unit 63 groups all the 640×480 pixels into 320×240 blocks each including two pixels in each of the horizontal direction and the vertical direction. Then, the detection processing unit 63 calculates the average value cnf_ave of the reliabilities cnf of all the 320×240 blocks, and detects the face of the user on the basis of the average value enf_ave of the reliabilities cnf of all the blocks that is calculated. For example, similarly to the head portion detection process, regarding the face of the user, the average value cnf_ave of the reliabilities cnf of all the 320×240 blocks is regarded as a low-resolution two-dimensional image, and it can be determined that the face of the user is detected in a case where the face, the eyes, and the mouth of the user are detected in the manner of pattern matching.

Figure 12:
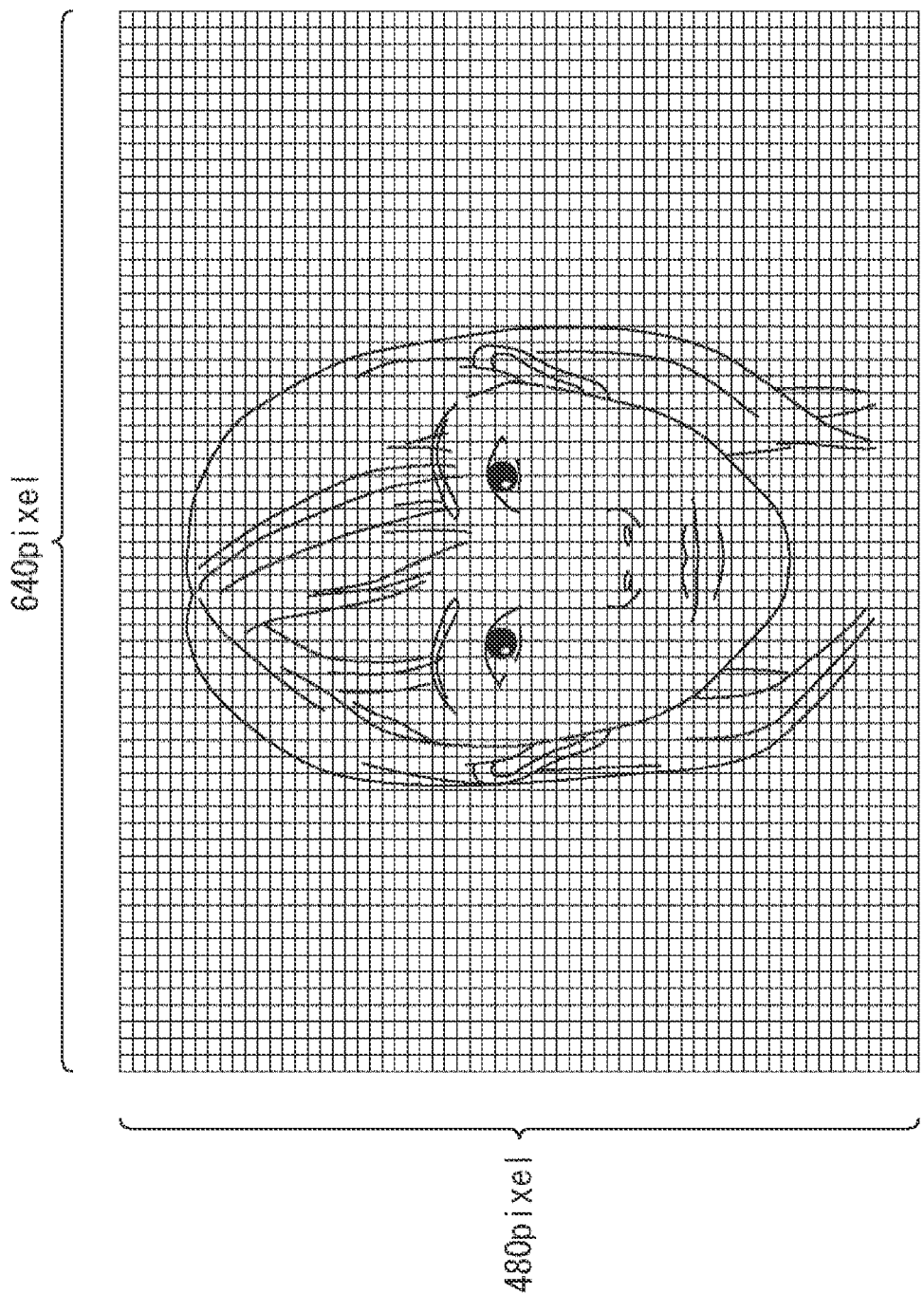
FIG. 12 is a diagram explaining a specific processing example of a pupil detection process.

FIG. 12 is a diagram illustrating a specific processing example of the pupil detection process.

In the pupil detection process, the detection processing unit 63 detects a pupil of the user by using the average value cnf_ave of the reliabilities cnf of all the 640×480 pixels as it is. Regarding a pupil of the user, for example, similarly to the face detection process, in a case where the vicinity of the position of an eye of the face is detected in the manner of pattern matching and a state in which an eye of the user is opened and is directed in a predetermined direction is detected, it can be determined that a pupil of the user is detected.

As described above, for example, in a case where the four detection processes, that is, the proximity detection process, the head portion detection process, the face detection process, and the pupil detection process are sequentially executed as a series of detection processes, the detection processing unit 63 can execute the detection processes by setting the resolution of the depth map or the reliability map regarded as a two-dimensional image such that the resolution becomes higher as the processing proceeds to a later detection process. Therefore, it is possible to balance the accuracy (high accuracy) of the detection process and the processing time (high-speed processing time).

Note that, although illustration is omitted, as in a general distance measuring sensor, an operation mode for generating and outputting only a depth map and a reliability map on the basis of the light reception signal of each pixel without executing the detection process is naturally prepared for the distance measuring sensor 43.

<Depth Measurement Process in Operation Mode B>

Next, a depth measurement process executed by the distance measuring module 11 in a case where the operation mode B of FIG. 8 is set as the operation mode will be described with reference to the flowchart of FIG. 13. This process is started, for example, when a distance measurement start command is supplied from the sensor hub 19.

First, in step S11, the control unit 61 of the signal processing unit 52 instructs the light emission controlling unit 42 to start light emission, and sets the operation mode specified by the sensor hub 19. If the light emission controlling unit 42 is instructed to start light emission, the light emission controlling unit 42 supplies to the light emitting unit 41 a light emission control signal for controlling the frequency and the light emission amount at the time of causing the light source to emit light. The light emitting unit 41 emits light while performing modulation at a timing corresponding to the light emission control signal supplied from the light emission controlling unit 42, and irradiates an object with irradiation light.

In step S12, the light receiving unit 51 executes a photoelectric conversion process of receiving and photoelectrically converting light (reflected light) reflected by the object, and outputs the light reception signal A and the light reception signal B obtained by distributing electric charge to the first tap 82A and the second tap 82B in each pixel 71 of the pixel array unit 72 to the depth calculation unit 62 of the signal processing unit 52.

In step S13, the depth calculation unit 62 generates a depth map and a reliability map from the two light reception signals A and B of each pixel 71 supplied from the pixel array unit 72 of the light receiving unit 51. The depth map and the reliability map that are generated are supplied to the detection processing unit 63.

In step S14, the detection processing unit 63 executes the proximity detection process of detecting whether or not the user is at a nearby location from the smartphone 1.

Then, in step S15, the detection processing unit 63 determines whether a nearby object is detected on the basis of the execution result of the proximity detection process. In a case where it is determined in step S15 that a nearby object is not detected, the processing returns to step S12.

In contrast, in a case where it is determined in step S15 that a nearby object is detected, the processing proceeds to step S16, and the detection processing unit 63 outputs the proximity detection result to the sensor hub 19, and the processing proceeds to step S17.

In step S17, the detection processing unit 63 executes the head portion detection process of detecting the head portion of the user.

Then, in step S18, the detection processing unit 63 determines whether the head portion is detected on the basis of the execution result of the head portion detection process. In a case where it is determined in step S18 that the head portion is not detected, the processing returns to step S12.

In contrast, in a case where it is determined in step S18 that the head portion is detected, the processing proceeds to step S19, and the detection processing unit 63 outputs the head portion detection result to the sensor hub 19, and the processing proceeds to step S20.

In step S20, the detection processing unit 63 executes the face detection process of detecting the face of the user.

Then, in step S21, the detection processing unit 63 determines whether the face is detected on the basis of the execution result of the face detection process. In a case where it is determined in step S21 that the face is not detected, the processing returns to step 312.

In contrast, in a case where it is determined in step S21 that the face is detected, the processing proceeds to step S22, and the detection processing unit 63 outputs the face detection result to the sensor hub 19 and the processing proceeds to step S23.

In step S23, the detection processing unit 63 executes the pupil detection process of detecting an eye and line-of-sight of the user.

Then, in step S24, the detection processing unit 63 determines whether a pupil is detected on the basis of the execution result of the pupil detection process. In a case where it is determined in step S24 that a pupil is not detected, the processing returns to step S12.

In contrast, in a case where it is determined in step S24 that a pupil is detected, the processing proceeds to step S25, and the detection processing unit 63 outputs the pupil detection result to the sensor hub 19 together with the depth map and the reliability map, and the processing is terminated.

The depth measurement process in a case where the operation mode B is set as the operation mode is executed as described above.

Figure 13:
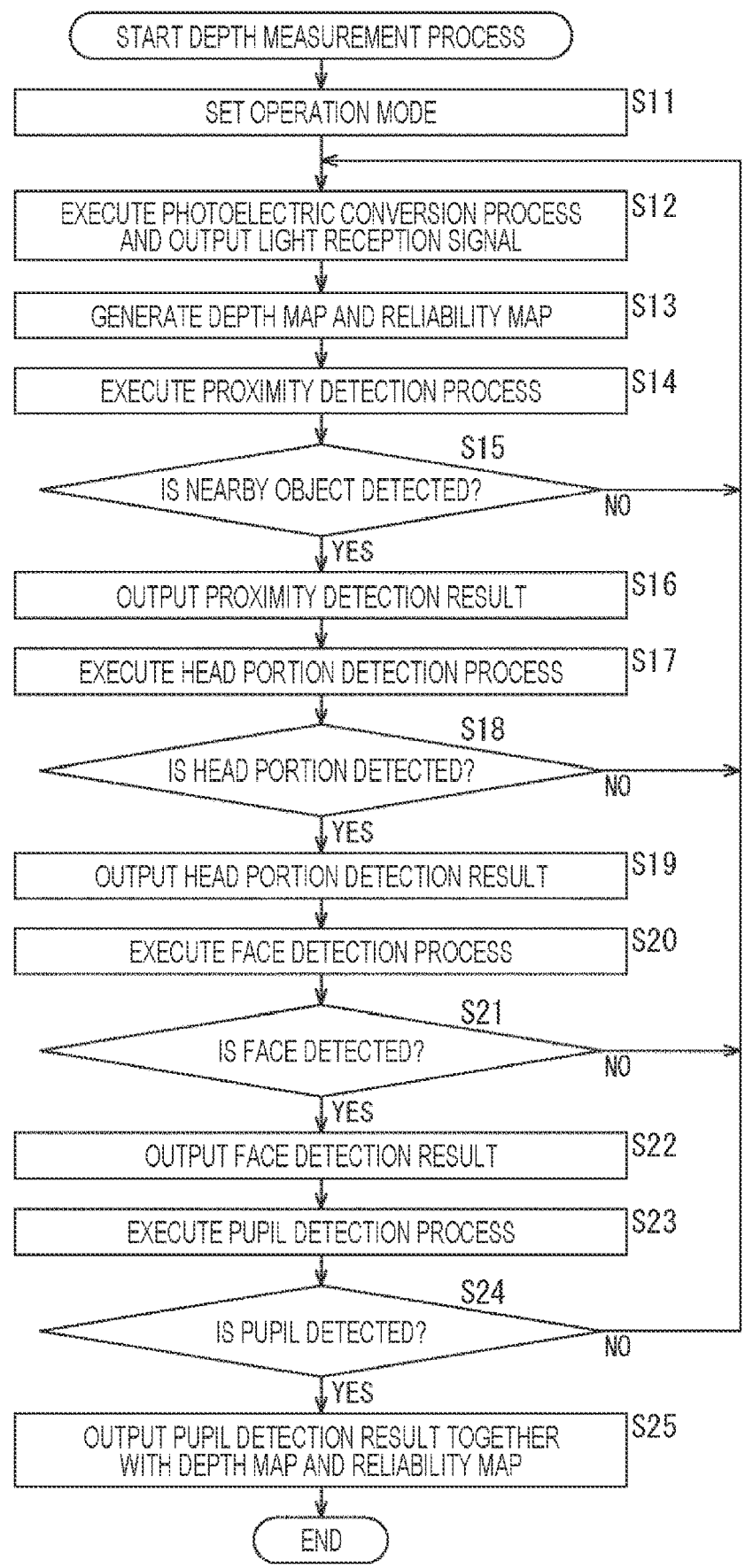
FIG. 13 is a flowchart explaining a depth measurement process in the case of an operation mode B.

Note that the depth measurement process in a case where the operation mode A is set as the operation mode corresponds to the process in which the processes of outputting the detection results in the respective detection processes other than the pupil detection process, which is the last process, specifically, steps S16, S19, and S22 are omitted in the depth measurement process of FIG. 13.

<Depth Measurement Process in Operation Mode D>

Next, a depth measurement process executed by the distance measuring module 11 in a case where the operation mode D of FIG. 8 is set as the operation mode will be described with reference to the flowchart of FIG. 14. This process is started, for example, when a distance measurement start command is supplied from the sensor hub 19.

The depth measurement process in the operation mode D is equal to the process in which the processes in steps S47, S51, and S55 are added to the depth measurement process in the operation mode B illustrated in FIG. 13.

Figure 14:
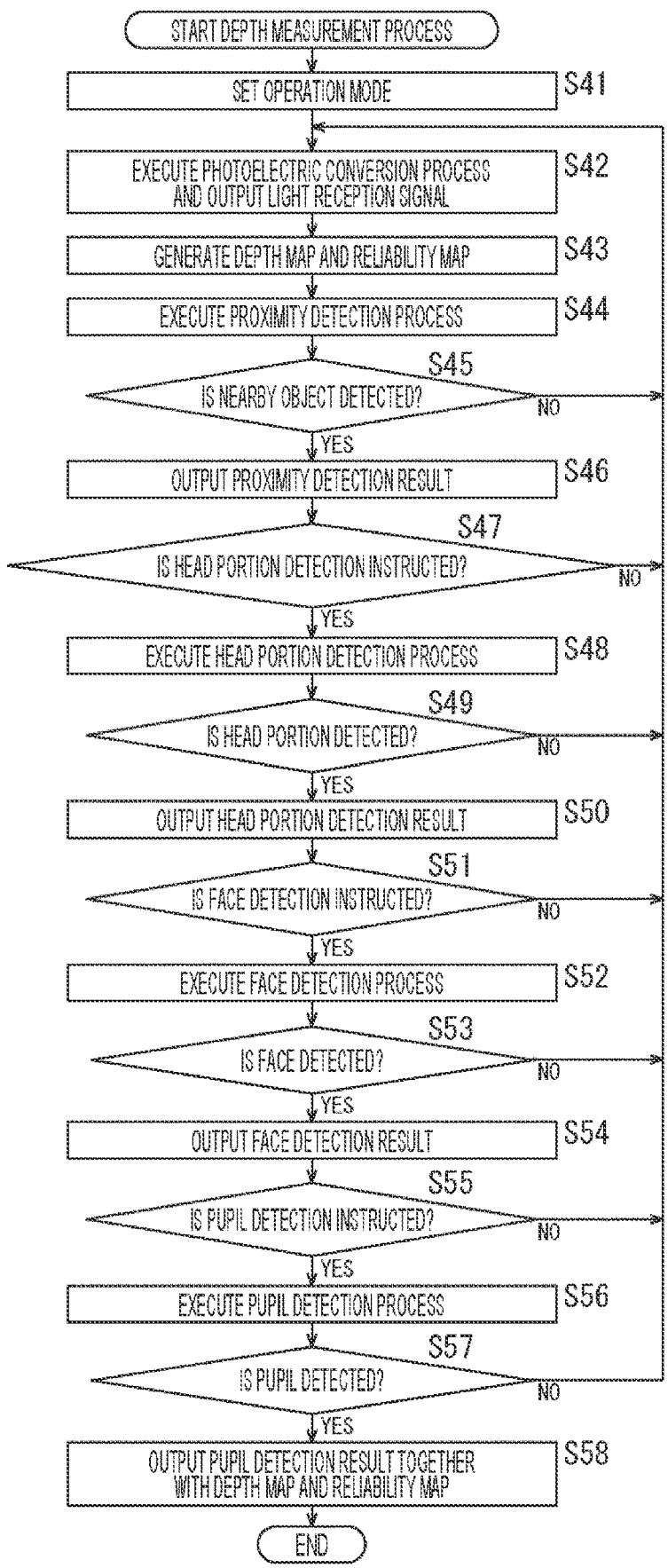
FIG. 14 is a flowchart explaining a depth measurement process in the case of an operation mode D.

More specifically, step S47 is added between step S46 in FIG. 14 corresponding to step S16 in FIG. 13 and step S48 in FIG. 14 corresponding to step S17 in FIG. 13, step 351 is added between step S50 in FIG. 14 corresponding to step S19 in FIG. 13 and step S52 in FIG. 14 corresponding to step S20 in FIG. 13, and step S55 is added between step S54 in FIG. 14 corresponding to step S22 in FIG. 13 and step S56 in FIG. 14 corresponding to step S23 in FIG. 13.

In step 347, after the proximity detection result is output to the sensor hub 19 in step S46, the detection processing unit 63 determines whether head portion detection is instructed from the sensor hub 19. In a case where it is determined in step S47 that head portion detection is not instructed, the processing returns to step S42. In contrast, in a case where it is determined in step S47 that head portion detection is instructed, the processing proceeds to step S48, and the head portion detection process is executed.

In step S51, after the head portion detection result is output to the sensor hub 19 in step S50, the detection processing unit 63 determines whether face detection is instructed from the sensor hub 19. In a case where it is determined in step S51 that face detection is not instructed, the processing returns to step S42. In contrast, in a case where it is determined in step 351 that the face detection is instructed, the processing proceeds to step 352, and the face detection process is executed.

In step S55, after the proximity detection result is output to the sensor hub 19 in step 354, the detection processing unit 63 determines whether pupil detection is instructed from the sensor hub 19. In a case where it is determined in step S55 that pupil detection is not instructed, the processing returns to step S42. In contrast, in a case where it is determined in step S55 that pupil detection is instructed, the processing proceeds to step S56, and the pupil detection process is executed.

As described above, the depth measurement process in a case where the operation mode D is set is different from the depth measurement process in a case where the operation mode B is set in that a next detection process is executed on the basis of an instruction to execute the next detection process from the sensor hub 19.

Note that, in the depth measurement processes in FIGS. 13 and 14, in a case where the processing up to pupil detection is not finally successful, the procedure of infinitely continuing the depth measurement process is adopted. However, actually, for example, an error process of terminating the depth measurement process in a case where the individual detection process has not been successful for a certain period of time is incorporated.

<5. Effect of Distance Measuring Sensor>

An effect of the distance measuring sensor 43 having a detection function will be described with reference to FIG. 15.

Figure 15:
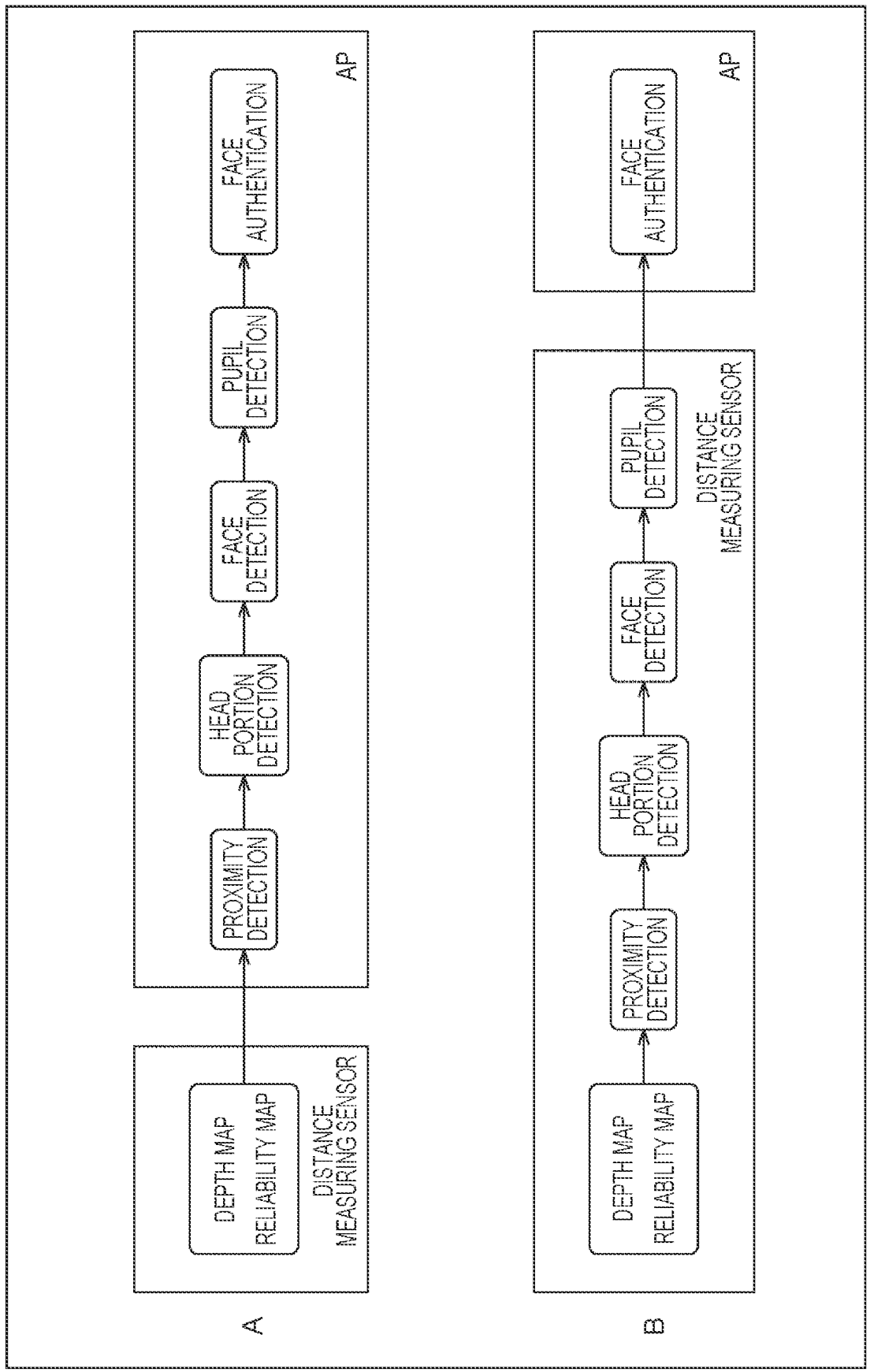
FIG. 15 is a diagram illustrating an effect of a distance measuring sensor to which the present technology is applied.

As illustrated in A of FIG. 15, a general distance measuring sensor generates only a depth map and a reliability map and outputs the depth map and the reliability map as distance measurement data. In this case, the AP 20 executes the proximity detection process, the head portion detection process, the face detection process, and the pupil detection process on the basis of the depth map and the reliability map, and executes the face authentication process on condition that the pupil detection process is successful. Until the pupil detection process is successful, it is necessary to repeatedly execute the pupil detection process while acquiring a large number of depth maps and reliability maps, and the AP 20 is a device that requires a large amount of power. Therefore, the amount of power required by the smartphone 1 also increases.

In contrast, according to the distance measuring sensor 43 to which the present technology is applied, as illustrated in B of FIG. 15, not only the depth map and the reliability map can be generated but also the proximity detection process, the head portion detection process, the face detection process, and the pupil detection process can be executed, and only in a case where the pupil detection process is successful and the face can be accurately distinguished, the pupil detection result, the depth map, and the reliability map are output to the AP 20. Therefore, the AP 20 is activated and the face authentication process is executed.

As a result, unnecessary activation of the AP can be suppressed and the amount of power required by the smartphone 1 can be reduced as compared with a case where the detection process as the preprocessing necessary for the face authentication process is executed by the AP 20.

The distance measuring module 11 described above can be mounted on, in addition to the smartphone as described above, for example, an electronic apparatus such as a tablet terminal, a mobile phone, a personal computer, a game console, a television receiver, a wearable terminal, a digital still camera, or a digital video camera.

<6. Example of Application to Moving Object>

The technology according to the present disclosure (present technology) can be applied to various products. For example, the technology according to the present disclosure may be realized as a device mounted on any type of a moving object such as an automobile, an electric car, a hybrid electric car, a motorcycle, a bicycle, a personal mobility vehicle, an airplane, a drone, a ship, or a robot.

Figure 16:
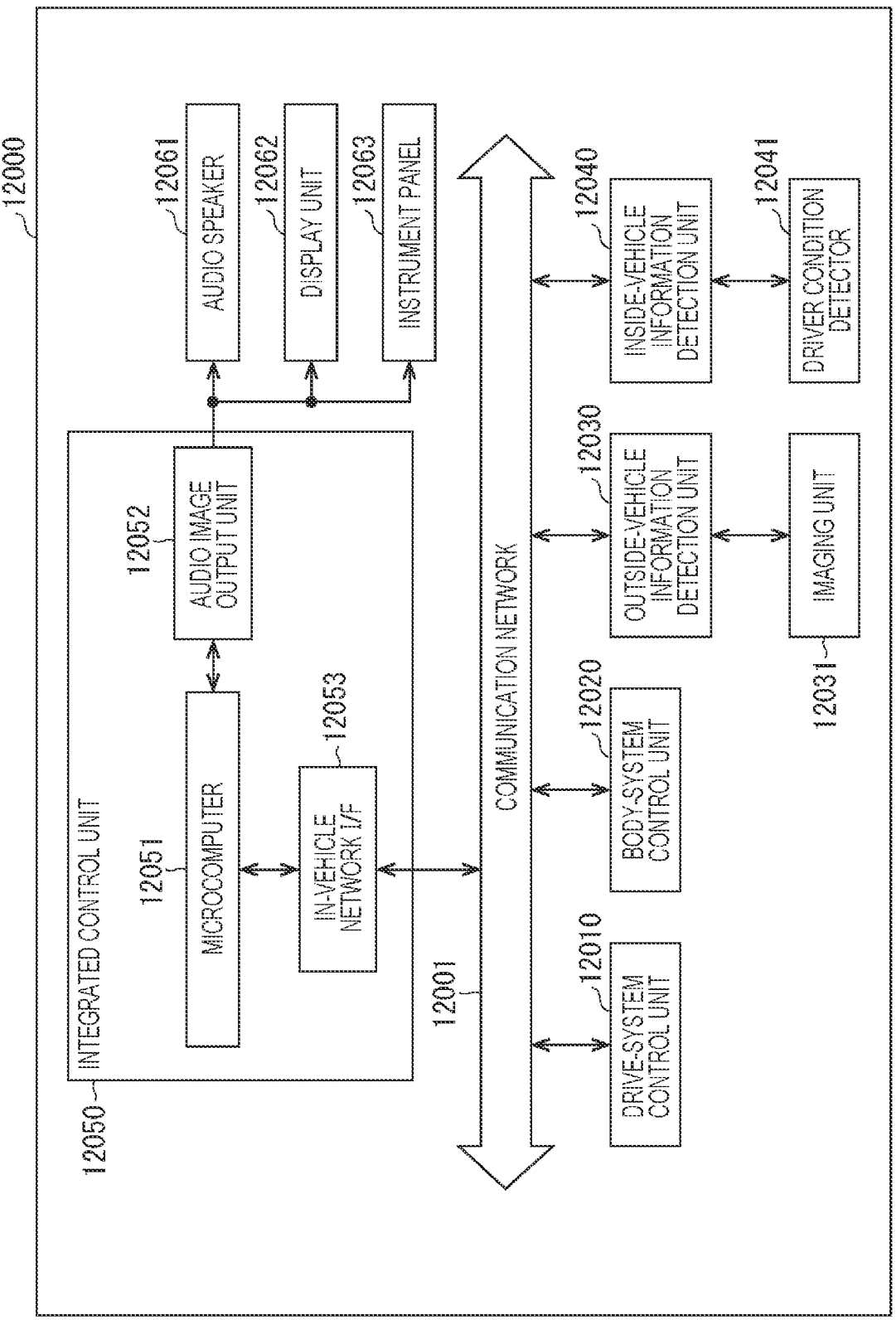
FIG. 16 is a block diagram illustrating an example of a schematic configuration of a vehicle control system.

FIG. 16 is a block diagram illustrating a schematic configuration example of a vehicle control system which is an example of a moving object control system to which the technology according to the present disclosure can be applied.

A vehicle control system 12000 includes a plurality of electronic control units connected via a communication network 12001. In the example illustrated in FIG. 16, the vehicle control system 12000 includes a drive-system control unit 12010, a body-system control unit 12020, an outside-vehicle information detection unit 12030, an inside-vehicle information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive-system control unit 12010 controls the operation of devices related to the drive system of a vehicle according to various programs. For example, the drive-system control unit 12010 functions as a control device for a drive force generation device for generating drive force of the vehicle such as an internal combustion engine or a drive motor, a drive force transmission mechanism for transmitting drive force to wheels, a steering mechanism that adjusts the steering angle of the vehicle, and a braking device that generates braking force of the vehicle.

The body-system control unit 12020 controls the operation of various devices provided on a vehicle body according to the various programs. For example, the body-system control unit 12020 functions as a control device for a keyless entry system, a smart key system, a power window device, or various lamps such as a headlamp, a back lamp, a brake lamp, a blinker, or a fog lamp. In this case, to the body-system control unit 12020, radio waves or signals of various switches transmitted from a portable machine substituting for a key can be input. The body-system control unit 12020 receives input of these radio waves or signals, and controls a door lock device, a power window device, a lamp, and the like of the vehicle.

The outside-vehicle information detection unit 12030 detects information of the outside of the vehicle on which the vehicle control system 12000 is mounted. For example, an imaging unit 12031 is connected to the outside-vehicle information detection unit 12030. The outside-vehicle information detection unit 12030 causes the imaging unit 12031 to capture an image outside the vehicle, and receives the captured image. The outside-vehicle information detection unit 12030 may perform a process of detecting an object such as a person, a car, an obstacle, a sign, a character on a road surface, or the like or a distance detection process on the basis of the received image.

The imaging unit 12031 is an optical sensor that receives light and outputs an electric signal according to the light reception amount of the light. The imaging unit 12031 can output an electric signal as an image or can output the electric signal as information of distance measurement. Furthermore, light received by the imaging unit 12031 may be visible light or invisible light such as infrared light.

The inside-vehicle information detection unit 12040 detects information of vehicle inside. For example, a driver condition detector 12041 that detects the condition of a driver is connected to the inside-vehicle information detection unit 12040. The driver condition detector 12041 includes, for example, a camera that captures an image of the driver, and the inside-vehicle information detection unit 12040 may calculate the degree of fatigue or the degree of concentration of the driver or may make a judgment as to whether or not the driver does not doze off, on the basis of detection information input from the driver condition detector 12041.

The microcomputer 12051 can arithmetically operate a control target value of the drive force generation device, the steering mechanism, or the braking device, on the basis of information of the inside and outside of the vehicle acquired by the outside-vehicle information detection unit 12030 or the inside-vehicle information detection unit 12040, and can output a control command to the drive-system control unit 12010. For example, the microcomputer 12051 can perform coordinated control aiming at realizing functions of an advanced driver assistance system (ADAS) including collision avoidance or shock mitigation of a vehicle, follow-up traveling based on inter-vehicle distance, traveling while maintaining vehicle speed, vehicle collision warning, vehicle lane deviation warning, or the like.

Furthermore, the microcomputer 12051 can perform coordinated control aiming at automatic driving or the like of autonomously traveling without depending on an operation of the driver, by controlling the drive force generation device, the steering mechanism, the braking device, or the like on the basis of vehicle periphery information acquired by the outside-vehicle information detection unit 12030 or the inside-vehicle information detection unit 12040.

Furthermore, the microcomputer 12051 can output a control command to the body-system control unit 12020 on the basis of the outside-vehicle information acquired by the outside-vehicle information detection unit 12030. For example, the microcomputer 12051 can perform coordinated control aiming at antiglare such as switching from a high beam to a low beam by controlling the headlamp according to the position of the preceding car or the oncoming car detected by the outside-vehicle information detection unit 12030.

The audio image output unit 12052 transmits an output signal of at least one of audio or an image to an output device capable of visually or aurally notifying a passenger or the outside of the vehicle of information. In the example of FIG. 16, an audio speaker 12061, a display unit 12062, and an instrument panel 12063 are illustrated as examples of the output device. For example, the display unit 12062 may include at least one of an on-board display or a head-up display.

Figure 17:
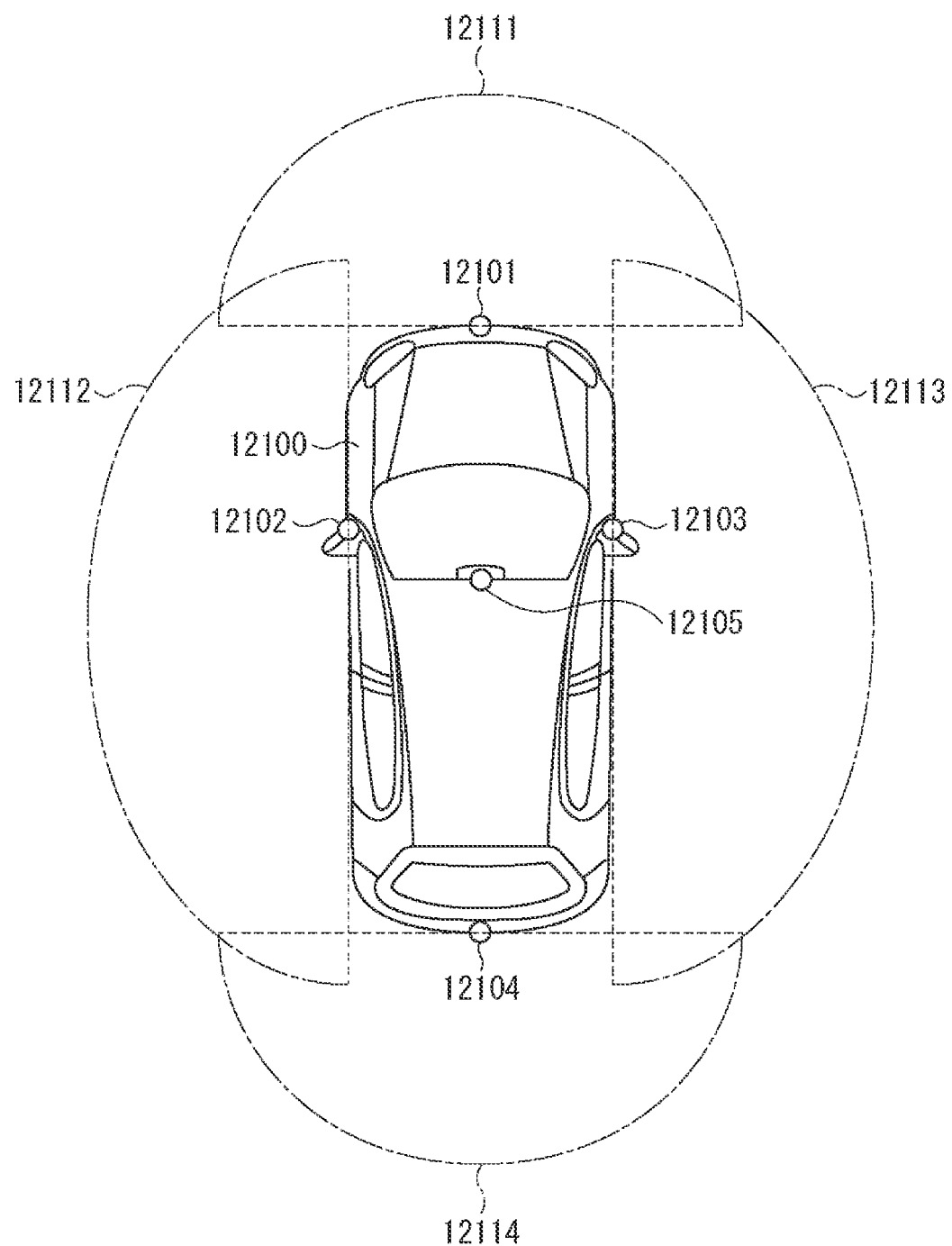
FIG. 17 is an explanatory view illustrating an example of installation locations of an outside-vehicle information detecting unit and imaging units.

FIG. 17 is a diagram illustrating examples of installation locations of the imaging unit 12031.

In FIG. 17, a vehicle 12100 includes imaging units 12101, 12102, 12103, 12104, 12105 as the imaging unit 12031.

For example, the imaging units 12101, 12102, 12103, 12104, 12105 are provided at locations such as a front nose, side mirrors, a rear bumper, a back door, and an upper portion of a windshield of a vehicle cabin of the vehicle 12100. The imaging unit 12101 provided on the front nose and the imaging unit 12105 provided on the upper portion of the windshield inside the vehicle cabin mainly acquire images in front of the vehicle 12100. The imaging units 12102, 12103 provided on the side mirrors mainly acquire images on lateral sides of the vehicle 12100. The imaging unit 12104 provided on the rear bumper or the back door mainly acquires an image behind the vehicle 12100. The front images acquired by the imaging units 12101, 12105 are mainly used to detect a preceding vehicle, a pedestrian, an obstacle, traffic lights, a traffic sign, a traffic lane, or the like.

Note that FIG. 17 illustrates examples of the imaging ranges of the imaging units 12101 to 12104. An imaging range 12111 indicates the imaging range of the imaging unit 12101 provided on the front nose, imaging ranges 12112, 12113 indicate the imaging ranges of the imaging units 12102, 12103 provided on the side mirrors, respectively, and an imaging range 12114 indicates the imaging range of the imaging unit 12104 provided on the rear bumper or the back door. For example, by overlapping pieces of image data captured by the imaging units 12101 to 12104, a bird's eye view of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements, or an imaging element having pixels for phase difference detection.

For example, the microcomputer 12051 can extract, in particular, a closest stereoscopic object on a traveling road of the vehicle 12100, the stereoscopic object traveling at predetermined speed (for example, 0 km/h or more) in substantially the same direction as in the vehicle 12100, as a preceding car, by determining the distance to each stereoscopic object in the imaging ranges 12111 to 12114 and the temporal change of the distance (relative speed with respect to the vehicle 12100), on the basis of the distance information obtained from the imaging units 12101 to 12104. Moreover, the microcomputer 12051 can set an inter-vehicle distance to be secured behind the preceding car, and can perform automatic brake control (including follow-up stop control), automatic acceleration control (including follow-up start control), or the like. As described above, it is possible to perform coordinated control aiming at automatic driving or the like of travelling autonomously without depending on the driver's operation.

For example, on the basis of the distance information obtained from the imaging units 12101 to 12104, the microcomputer 12051 can classify stereoscopic object data relating to stereoscopic objects into two-wheeled vehicles, ordinary vehicles, large vehicles, pedestrians, utility poles, and other stereoscopic objects and extract them so as to be able to use them for automatic avoidance of obstacles. For example, the microcomputer 12051 identifies obstacles around the vehicle 12100 as obstacles visible to the driver of the vehicle 12100 and as obstacles hardly visible to the driver of the vehicle 12100. Then, the microcomputer 12051 judges the collision risk indicating the degree of risk of collision with each obstacle, and in a situation where there is a possibility of collision with the collision risk equal to or more than a set value, the microcomputer 12051 can perform driving support for collision avoidance by outputting an alarm to the driver through the audio speaker 12061 or the display unit 12062 or performing forcible deceleration or avoidance steering through the drive-system control unit 12010.

At least one of the imaging units 12101 to 12104 may be an infrared camera that detects infrared light. For example, the microcomputer 12051 can recognize a pedestrian by judging whether or not a pedestrian is present in the images captured by the imaging units 12101 to 12104. Such pedestrian recognition is performed, for example, according to procedures for extracting characteristic points in images captured by the imaging units 12101 to 12104 as infrared cameras, and procedures for performing a pattern matching process on a series of characteristic points indicating the outline of an object to make a judgment as to whether or not the object is a pedestrian. If the microcomputer 12051 judges that a pedestrian is present in the captured images of the imaging units 12101 to 12104 and recognizes the pedestrian, the audio image output unit 12052 causes the display unit 12062 to display a square outline for emphasizing so as to be overlapped with the recognized pedestrian. Furthermore, the audio image output unit 12052 may cause the display unit 12062 to display an icon or the like indicating a pedestrian at a desired location.

An example of the vehicle control system to which the technology according to the present disclosure can be applied has been described above. The technology according to the present disclosure can be applied to the inside-vehicle information detection unit 12040 or the driver condition detector 12041 in the above-described configuration. Specifically, by using the depth measurement process performed by the distance measuring module 11 as the inside-vehicle information detection unit 12040 or the driver condition detector 12041 to perform various types of detection processes before performing a driver's face recognition process, the face recognition process, which will be performed later, can be accurately performed, and the condition of the driver can be more accurately detected.

Note that the present technology can be applied to a method for amplitude modulating light projected onto an object, which is referred to as a Continuous-Wave method among Indirect ToF methods. Furthermore, the structure of the photodiode 81 of the light receiving unit 51 can also be applied to a distance measuring sensor having a current assisted photonic demodulator (CAPD) structure. Moreover, the present technology may be applied to a distance measuring sensor of a structured light method. The embodiments of the present technology are not limited to the above-described embodiments, and various modifications can be made without departing from the scope of the present technology.

Each of the plurality of the present technologies described in the present Description can be implemented independently as long as there is no contradiction. It is needless to say that a plurality of arbitrary present technologies can be implemented in combination. For example, part or entirety of the present technology described in any of the embodiments can be implemented in combination with part or entirety of the present technology described in another embodiment. Furthermore, part or entirety of an arbitrary present technology described above can be implemented in combination with another technology not described above.

Furthermore, for example, a configuration described as one device (or processing unit) may be divided and configured as a plurality of devices (or processing units). In contrast, the configurations described as a plurality of devices (or processing units) hereinbefore may be collectively configured as one device (or processing unit). Furthermore, it goes without saying that a configuration other than those described above may be added to the configuration of each device (or each processing unit). Moreover, if the configuration and operation of the system as a whole are substantially the same, part of the configuration of a certain device (or processing unit) may be included in the configuration of another device (or another processing unit).

Moreover, in the present Description, a system means a set of a plurality of constituents (devices, modules (components), or the like), and it does not matter whether or not all the constituents are in the same case. Therefore, each of a plurality of devices housed in separate cases and connected via a network, and one device in which a plurality of modules is housed in one case are a system.

Furthermore, for example, the program described above can be executed in an arbitrary device. In that case, it is sufficient that the device has a necessary function (functional block or the like) and can obtain necessary information.

Note that the effects described in the present Description are illustrations only and not limited, and may have effects other than the effects described in the present Description.

Note that the present technology can be configured as follows.

(1)

A distance measuring sensor including:
  a light receiving unit that receives reflected light obtained by reflection of irradiation light emitted from a predetermined light emitting source by an object;
  a depth calculation unit that calculates distance information to the object and luminance information from
  a signal obtained by the light receiving unit; and a detection processing unit that executes a predetermined detection process by using at least one of the distance information or the luminance information in accordance with a current operation mode selected from among a plurality of operation modes, and outputs a result of a detection process to an outside together with the distance information and the luminance information.

(2)

The distance measuring sensor according to the (1), in which one of the plurality of operation modes is a mode for executing a plurality of detection processes including a first detection process and a second detection process, and the detection processing unit executes the second detection process in a case where a detection target is detected in the first detection process, and outputs a result of the second detection process to the outside together with the distance information and the luminance information in a case where a detection target is detected in the second detection process.

(3)

The distance measuring sensor according to the (2), in which in a case where a detection target is detected in the first detection process, the detection processing unit outputs a result of the first detection process to the outside and executes the second detection process.

(4)

The distance measuring sensor according to any one of the (1) to (3), in which one of the plurality of operation modes is a mode for executing a plurality of detection processes including a first detection process and a second detection process, and the detection processing unit outputs a result of the first detection process to the outside in a case where a detection target is detected in the first detection process, executes the second detection process when an instruction to execute the second detection process is supplied from the outside, and outputs a result of the second detection process to the outside together with the distance information and the luminance information in a case where a detection target is detected in the second detection process.

(5)

The distance measuring sensor according to any one of the (1) to (4), in which one of the plurality of operation modes is a mode for sequentially executing a plurality of detection processes, and a resolution of the distance information or the luminance information in the plurality of detection processes becomes higher as processing proceeds to a later detection process.

(6)

The distance measuring sensor according to any one of the (1) to (5), in which the detection process includes at least any one of a proximity detection process, a head portion detection process, a face detection process, or a pupil detection process.

(7)

The distance measuring sensor according to the (6), in which one of the plurality of operation modes is a mode of the detection process for executing any one of the proximity detection process, the head portion detection process, the face detection process, or the pupil detection process.

(8)

The distance measuring sensor according to any one of the (1) to (7) further including a control unit that selects a predetermined operation mode from among a plurality of operation modes and causes the detection processing unit to execute a predetermined detection process corresponding to a current operation mode.

(9)

A signal processing method including:

by using a distance measuring sensor, calculating distance information to an object and luminance information from a signal obtained by receiving reflected light obtained by reflection of irradiation light emitted from a predetermined light emitting source by the object; and by using the distance measuring sensor, executing a predetermined detection process by using at least one of the distance information or the luminance information in accordance with a current operation mode selected from among a plurality of operation modes, and outputting a result of a detection process to an outside together with the distance information and the luminance information.

(10)

A distance measuring module including:

a light emitting unit that includes a predetermined light emitting source; and a distance measuring sensor, the distance measuring sensor including:

a light receiving unit that receives reflected light obtained by reflection of irradiation light emitted from the predetermined light emitting source by an object;

a depth calculation unit that calculates distance information to the object and luminance information from a signal obtained by the light receiving unit; and a detection processing unit that executes a predetermined detection process by using at least one of the distance information or the luminance information in accordance with a current operation mode selected from among a plurality of operation modes, and outputs a result of a detection process to an outside together with the distance information and the luminance information.

REFERENCE SIGNS LIST

1 Smartphone
11 Distance measuring module
15 Sensor unit
19 Sensor hub
20 AP (application processor)
11 Distance measuring module
41 Light emitting unit
42 Light emission controlling unit
43 Distance measuring sensor
51 Light receiving unit
52 Signal processing unit
61 Control unit
62 Depth calculation unit
63 Detection processing unit

The invention claimed is:

1. A distance measuring sensor comprising:
a memory storing a program, and
at least one processor configured to execute the program to perform operations comprising:

receiving, by a light receiving unit, reflected light obtained by reflection of irradiation light emitted from a predetermined light emitting source by an object;

calculating distance information to the object and luminance information from a signal obtained by the light receiving unit;

executing a predetermined detection process by using at least one of the distance information or the luminance information in accordance with a current operation mode selected from among a plurality of operation modes, wherein the plurality of operation modes include a first detection process and a second detection process;

executing the second detection process in a case where a detection target is detected in the first detection process; and outputting a result of the second detection process together with the distance information and the luminance information in a case where the detection target is detected in the second detection process.

2. The distance measuring sensor according to claim 1, wherein the operations further comprise:

in a case where the detection target is detected in the first detection process, outputting a result of the first detection process and executing the second detection process.

3. The distance measuring sensor according to claim 1, wherein the operations further comprise:

outputting a result of the first detection process in a case where the detection target is detected in the first detection process;

executes the second detection process when an instruction to execute the second detection process is received; and outputting a result of the second detection process together with the distance information and the luminance information in a case where a detection target is detected in the second detection process.

4. The distance measuring sensor according to claim 1, wherein one of the plurality of operation modes is a mode for sequentially executing a plurality of detection processes, and a resolution of the distance information or the luminance information in the plurality of detection processes becomes higher as processing proceeds to a later detection process.

5. The distance measuring sensor according to claim 1, wherein the detection process includes at least any one of a proximity detection process, a head portion detection process, a face detection process, or a pupil detection process.

6. The distance measuring sensor according to claim 5, wherein one of the plurality of operation modes is a mode for executing any one of the proximity detection process, the head portion detection process, the face detection process, and the pupil detection process.

7. The distance measuring sensor according to claim 1, wherein the operations further comprise:

selecting a predetermined operation mode from among a plurality of operation modes and causing the detection processing unit to execute a predetermined detection process corresponding to a current operation mode.

8. A signal processing method comprising:

receiving, by a light receiving unit, reflected light obtained by reflection of irradiation light emitted from a predetermined light emitting source by an object;

calculating distance information to the object and luminance information from a signal obtained by the light receiving unit;

executing a predetermined detection process by using at least one of the distance information or the luminance information in accordance with a current operation mode selected from among a plurality of operation modes, wherein the plurality of operation modes include a first detection process and a second detection process;

executing the second detection process in a case where a detection target is detected in the first detection process; and outputs a result of the second detection process together with the distance information and the luminance information in a case where the detection target is detected in the second detection process.

9. A non-transitory computer readable medium storing a program, the program being executable by a processor to perform operations comprising:

receiving, by a light receiving unit, reflected light obtained by reflection of irradiation light emitted from a predetermined light emitting source by an object;

calculating distance information to the object and luminance information from a signal obtained by the light receiving unit;

executing a predetermined detection process by using at least one of the distance information or the luminance information in accordance with a current operation mode selected from among a plurality of operation modes, wherein the plurality of operation modes include a first detection process and a second detection process;

executing the second detection process in a case where a detection target is detected in the first detection process; and outputs a result of the second detection process together with the distance information and the luminance information in a case where the detection target is detected in the second detection process.

10. The non-transitory computer readable medium according to claim 9, wherein the operations further comprise:

in a case where the detection target is detected in the first detection process, outputting a result of the first detection process and executing the second detection process.

11. The non-transitory computer readable medium according to claim 9, wherein the operations further comprise:

outputting a result of the first detection process in a case where the detection target is detected in the first detection process;

executing the second detection process when an instruction to execute the second detection process is received; and outputting a result of the second detection process together with the distance information and the luminance information in a case where a detection target is detected in the second detection process.

12. The non-transitory computer readable medium according to claim 9, wherein one of the plurality of operation modes is a mode for sequentially executing a plurality of detection processes, and a resolution of the distance information or the luminance information in the plurality of detection processes becomes higher as processing proceeds to a later detection process.

13. The non-transitory computer readable medium according to claim 9, wherein the detection process includes at least any one of a proximity detection process, a head portion detection process, a face detection process, or a pupil detection process.

14. The non-transitory computer readable medium according to claim 13, wherein one of the plurality of operation modes is a mode for executing any one of the proximity detection process, the head portion detection process, the face detection process, and the pupil detection process.

15. The non-transitory computer readable medium according to claim 9, wherein the operations further comprise:
   selecting a predetermined operation mode from among a plurality of operation modes and causing the detection processing unit to execute a predetermined detection process corresponding to a current operation mode.

\* \* \* \* \*